(12) United States Patent
Sasaki et al.

(10) Patent No.: US 10,583,824 B2
(45) Date of Patent: Mar. 10, 2020

(54) TORQUE DISTRIBUTION CONTROL DEVICE FOR VEHICLE

(71) Applicant: HONDA MOTOR CO., LTD., Tokyo (JP)

(72) Inventors: Hitoshi Sasaki, Wako (JP); Tetsuro Hara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 171 days.

(21) Appl. No.: 15/825,217

(22) Filed: Nov. 29, 2017

(65) Prior Publication Data

US 2018/0154882 A1    Jun. 7, 2018

(30) Foreign Application Priority Data

Dec. 5, 2016 (JP) ................................ 2016-236298
Mar. 30, 2017 (JP) ................................ 2017-069151
Mar. 30, 2017 (JP) ................................ 2017-069152

(51) Int. Cl.
*B60W 10/119* (2012.01)
*B60W 30/045* (2012.01)
(Continued)

(52) U.S. Cl.
CPC ........... *B60W 10/119* (2013.01); *B60K 6/485* (2013.01); *B60K 6/52* (2013.01); *B60K 17/02* (2013.01);
(Continued)

(58) Field of Classification Search
CPC .... B60W 10/119; B60W 10/12; B60W 10/14; B60W 10/16; B60W 30/045
See application file for complete search history.

(56) References Cited

U.S. PATENT DOCUMENTS 5,370,588 A * 12/1994 Sawase ................. B60K 17/20
                                                                475/199
5,894,904 A    4/1999 Yakou et al.
(Continued)

FOREIGN PATENT DOCUMENTS

| JP | 9-193680 A | 7/1997 |
| JP | 2011-79420 A | 4/2011 |
| WO | 2012/005256 A1 | 1/2012 |

OTHER PUBLICATIONS

Notice of Reasons for Rejection dated Sep. 25, 2018, issued in counterpart Japanese Application No. 2017-069152, with English translation. (6 pages).

(Continued)

*Primary Examiner* — Edwin A Young
(74) *Attorney, Agent, or Firm* — Westerman, Hattori, Daniels & Adrian, LLP

(57) ABSTRACT

A vehicle includes a left clutch provided on a path for transmitting driving torque to a left rear wheel and a right clutch provided on a path for transmitting driving torque to a right rear wheel torque. If a command value of the driving torque distributed to the left rear wheel using the left clutch and a command value of the driving torque distributed to the left rear wheel using the right clutch fall respectively below predetermined lower limit values, a control device controls the command values of the driving torque to be predetermined lower limit values. While realizing an optimal torque distribution control, accuracy of the driving torque distributed to the left and right rear wheels (auxiliary drive wheels) can be improved by preventing the command values (command torque) distributed to the left and right rear wheels from becoming small below the limit.

12 Claims, 17 Drawing Sheets

(51) Int. Cl.
    *B60W 40/10* (2012.01)
    *B60K 17/04* (2006.01)
    *B60K 17/02* (2006.01)
    *B60W 10/12* (2012.01)
    *B60K 6/485* (2007.10)
    *B60W 10/16* (2012.01)
    *B60K 6/52* (2007.10)

(52) U.S. Cl.
    CPC ........... *B60K 17/046* (2013.01); *B60W 10/12* (2013.01); *B60W 10/16* (2013.01); *B60W 30/045* (2013.01); *B60W 40/10* (2013.01); *B60W 2520/10* (2013.01); *B60W 2520/105* (2013.01); *B60W 2520/125* (2013.01); *B60W 2540/18* (2013.01); *B60W 2720/106* (2013.01); *Y02T 10/6226* (2013.01); *Y02T 10/6265* (2013.01)

(56) References Cited

U.S. PATENT DOCUMENTS

| | | | |
|---|---|---|---|
| 2004/0050597 A1* | 3/2004 | Ai | B60K 6/445 180/65.235 |
| 2012/0166055 A1 | 6/2012 | Ozawa | |
| 2012/0259523 A1* | 10/2012 | Dehren | B60K 23/0808 701/69 |
| 2014/0074368 A1* | 3/2014 | Stares | B60K 17/34 701/69 |

OTHER PUBLICATIONS

Office Action dated Dec. 18, 2018, issued in counterpart JP application No. 2016-236298, with English translation. (6 pages).

Notice of Reasons for Rejection dated Jun. 5, 2018, issued in counterpart Japanese Application No. 2016-236298, with English translation (8 pages).

* cited by examiner

TORQUE DISTRIBUTION CONTROL DEVICE FOR VEHICLE

CROSS-REFERENCE TO RELATED APPLICATION

The present disclosure relates to subjects included in Japanese Patent Application 2016-236298 filed dated on Dec. 5, 2016, and Japanese Patent Application 2017-069151 and Japanese Patent Application 2017-069152 filed dated on Mar. 30, 2017, and, as a whole, the disclosure therein should be incorporated in this application explicitly by reference.

BACKGROUND OF THE INVENTION

1. Field of the Invention

The present invention relates to a torque distribution device for a four-wheel drive vehicle, in which either ones of front or rear wheels are first drive wheels (main drive wheels) and the others are second drive wheels (auxiliary drive wheels). The torque distribution device includes a front-rear torque distribution device for distributing driving torque transmitted to the first drive wheels and the second drive wheels, a left-right torque distribution device for distributing driving torque transmitted to a left second drive wheel and a right second drive wheel, and a control device for controlling the driving torque distributed using the front-rear torque distribution device and the left-right torque distribution device.

2. Description of Related Art

Conventionally, for example, a vehicle as disclosed in Japanese Unexamined Patent Application Publication No. 2011-079420 (Patent Document 1) is a four-wheel drive vehicle in which front wheels are main drive wheels and rear wheels are auxiliary drive wheels, and further provided with an electromagnetic type torque distribution clutch, as a driving force distribution device for distributing a driving force to the left and right rear wheels, on each of driving force transmission paths connected to the left and right rear wheels. By changing an engaging force of the torque distribution clutch, the ratio of torque distributed between the left and right rear wheels can be arbitrarily controlled.

In such vehicle, yaw moment of the vehicle is controlled by using a driving force difference between the left and right rear wheels under the control of the electromagnetic clutch, in addition to steering of a steering wheel. Namely, estimated driving torque output from a transmission is calculated on the basis of engine speed and intake negative pressure (or intake air flow rate), and the like. Based on the calculated estimated driving torque, lateral acceleration of the vehicle, a steering angle and wheel speed, torque distributed to the left and right rear wheels is calculated. For example, if a slip angle of the vehicle is equal to or larger than a predetermined value, a vehicle behavior is determined to be in an unstable state. As a result, a rear differential gear is controlled to reduce the torque distributed to the left and right rear wheels and the torque distributed to a turning outer wheel of the left and rear wheels, thereby achieving stabilization of the vehicle behavior.

SUMMARY OF THE INVENTION

If a command value of the torque (command torque) becomes zero temporarily when controlling the torque distributed to the left and right rear wheels as described above, a delay occurs in the rise of subsequent actual torque for the command torque, which causes decrease in torque response. Also, due to characteristics of the clutch for distributing the torque to the left and right rear wheels, in a range where the command torque is close to zero, a response waveform of the actual torque for the command torque becomes nonlinear, which makes it difficult to sufficiently secure the accuracy of the actual torque for the command torque. For this reason, in the control of the torque distributed to the left and right rear wheels, it is desirable to avoid as much as possible any conditions in which the command torque becomes zero or close to zero.

In this regard, in the conventional control, a control is performed in such a manner that no command torque falls below a predetermined lower limit value (positive value), and an entire command torque value is determined based on this lower limit value. However, since this method requires a large command torque value as a whole, excessive torque is distributed to the left and right rear wheels, leaving plenty of room for further improvement for optimal torque distribution control.

Further, in the conventional control, the control is performed in such manner that no command torque falls below the predetermined lower limit value (positive value), and the entire command torque value is determined based on this lower limit value. However, according to this method, if the predetermined lower limit value is adopted even when the command value of the driving torque transmitted to the rear wheels (namely, the left and right rear wheels), which are the auxiliary drive wheels (namely, a sum of left and right values), is lower than this predetermined lower limit value, the driving torque is transmitted to the rear wheels even in such a running condition of the vehicle that the command value of the driving torque distributed to the rear wheels is very small or substantially zero (for example, when an accelerator is off). This causes a problem that the fuel consumption (fuel consumption rate) of the vehicle and the durability of the device is affected.

Also, when, as described above, controlling the torque distributed to the left and right auxiliary drive wheels (rear wheels), a (left-right) difference is generated between the command values of the torque distributed to each of the left and right auxiliary drive wheels, whereby the torque distributed to the auxiliary drive wheels (a front-rear distribution amount) of the main drive wheels (front wheels) and the auxiliary drive wheels (rear wheels) may exceed the command value thereof. In such case, in order to prevent unstabilization of the vehicle and improve running performance, it is preferable to decide which to choose, on the basis of a running condition of the vehicle, to prioritize to make the left-right difference (left-right distribution amount) follow the command value thereof or a front-rear difference (the front-rear distribution amount) follow the command value thereof.

The present invention was made in view of above-mentioned problems, and the purpose is to effectively improve accuracy of driving torque distributed to left and right wheels by preventing a command value (command torque) of the torque distributed to the left and right wheels from becoming a small value exceeding a limit, while realizing an optimal torque distribution control in a torque distribution control device for a vehicle.

Another object of the present invention is to improve fuel efficiency (fuel consumption rate) of the vehicle and durability of the device by preventing the driving torque from being transmitted to auxiliary drive wheels in a running condition of the vehicle that the command value of the driving torque distributed to the auxiliary drive wheels (the rear wheels) is very small or substantially zero.

Still another object of the present invention is to effectively prevent an unstable behavior of a four-wheel drive vehicle, in which front wheels are first drive wheels (main drive wheels) and rear wheels are second drive wheels (auxiliary drive wheels), provided with a drive force distribution device for distributing a driving force to the front and rear and left and right wheels, and to achieve effective improvement of running performance by enabling a more optimal torque distribution control at the time of front-rear and left-right driving torque distribution controls.

In order to achieve the above objects, a first embodiment of the present invention is characterized in the following way. Namely, a torque distribution control device for a vehicle includes left and right wheels (WRL, WRR) to which driving torque output from a drive source (engine E) is transmitted, torque distribution devices (40L, 40R) for distributing the driving torque transmitted to one of the left and right wheels (WRL, WRR) and the other thereof according to a running condition of the vehicle, and a control device (Ua) for controlling the driving torque distributed by the torque distribution device. Namely, a torque distribution control device for a vehicle includes left and right wheels (WRL, WRR) to which driving torque output from a drive source (engine E) is transmitted, torque distribution devices (40L, 40R) for distributing the driving torque transmitted to one of the left and right wheels (WRL, WRR) and the other thereof according to a running condition of the vehicle, and a control device (Ua) for controlling the driving torque distributed by the torque distribution device. If a command value (LTq) of the driving torque distributed to the one of the left wheel and the right wheel using the one clutch and a command value (RTq) of the driving torque distributed to the other thereof using the other clutch fall below respective predetermined lower limit values (LTq1, RTq1), the control device performs a control to set the command values of the driving torque at the predetermined lower limit values.

According to this torque distribution control device for the vehicle, if the command value of the driving torque distributed to the one of the left wheel and the right wheel using the one clutch and the command value of the driving torque distributed to the other thereof using the other clutch fall below the respective predetermined lower limit values, the command values of the driving torque are controlled to be the respective predetermined lower limit values, thereby preventing the command values of the driving torque from being below the limit, such as temporarily becoming zero or nearly zero. This enables to prevent a delay in the rise of the actual torque for the command torque, thereby improving the torque response. Further, since the response waveform of the actual torque for the command torque can be made linear or nearly linear, the accuracy of the actual torque for the command torque can be achieved. Thus, it is possible to effectively improve the accuracy of the driving torque distributed to the left wheel and the right wheel of the vehicle. Further, compared to the conventional control in which the entire command torque value is determined based on the lower limit value, the command value of the driving torque can be prevented from becoming large as a whole. Consequently, the driving torque more than necessary can be effectively prevented from being distributed to the left and right wheels.

Also, in this torque distribution control device for the vehicle, the control device may control a difference (ΔTq) between the command value of the driving torque distributed to the one of the left wheel and the right wheel using the one clutch and the command value of the driving torque distributed to the other thereof using the other clutch to be a constant value.

According to this configuration, by controlling the difference between the command values to be constant, an appropriate difference in driving torque can be provided according to demand values of driving forces of the left wheel and the right wheel. Thus, a more appropriate driving force distribution control can be performed.

Further, in the torque distribution control device for the vehicle, if the command value (LTq or RTq) of the driving torque distributed to the one of the left wheel and the right wheel using the one clutch falls below the predetermined lower limit value (LTq1 or RTq1), the control device may perform a control to add the difference (ΔLTq or ΔRTq) between the command value of the driving torque (LTq or RTq) and the predetermined lower limit value (LTq1 or RTq1) to the command value (RTq or LTq) of the driving torque distributed to the other of the left wheel and the right wheel using the other clutch.

According to this configuration, by adding the difference between the command value of the driving torque of the one clutch and the predetermined lower limit value to the command value of the driving torque of the other clutch, the difference between the command value of the driving torque of the one clutch and the command value of the driving torque of the other clutch can be secured while preventing the command value of the driving torque of the one clutch from falling below the predetermined lower limit value. Therefore, while the command value of the driving torque is prevented from becoming small below the limit, an appropriate difference in driving torque according to the demand values of the driving forces of the left wheel and the right wheel can be provided, whereby a more appropriate driving force distribution control can be performed.

Further, a second embodiment of the present invention is characterized in the following way. Namely, in a four-wheel drive vehicle in which ones of front wheels (WFL, WFR) and rear wheels (WRL, WRR) are first drive wheels (main drive wheels in any embodiments of the present invention) and the others are second drive wheels (auxiliary drive wheels in any embodiments of the present invention), a torque distribution control device includes a front-rear torque distribution device (14) for distributing driving torque distributed to the first drive wheels and the second drive wheels, a left-right torque distribution device (16) for distributing driving torque distributed to a left second wheel (WRL) and a right second drive wheel (WRR), which are the second drive wheels, and a control device (Ua) for controlling the driving torque distributed using the front-rear torque distribution device and the left-right torque distribution device. If one of a command value (LTq) of left driving torque distributed to the left second drive wheel and a command value (RTq) of right driving torque distributed to the right second drive wheel using the left-right torque distribution device falls below a predetermined lower limit value (L1=LTq1, RTq1), the control device (Ua) performs a control to set the one of the command value (LTq) of the left driving torque or the command value (RTq) of the right driving torque to be the predetermined lower limit value (L1). In addition, the control device (Ua) calculates a command value of left-right sum torque (TM=LTq+RTq), which is a sum of the command value of the left driving torque (LTq) and the command value of the right driving torque (RTq), and if the command value of the left-right sum torque (TM) falls below the predetermined lower limit value (TM<L1), changes the predetermined lower limit value to the command value of the left-right sum torque (TM).

According to this torque distribution control device for the four-wheel drive vehicle, if the command values of the driving torque distributed to the left second drive wheel and the right second drive wheel using the left-right torque distribution device fall below the respective predetermined lower limit values, the command values of the driving torque can be prevented from becoming small below the limit, such as temporarily becoming zero or close to zero, by controlling the command values of the driving torque to be the predetermined lower limit values.

This enables to prevent a delay in the rise of the actual torque for the command torque, thereby improving the torque response. Further, since the response waveform of the actual torque for the command torque can be made linear or nearly linear, the accuracy of the actual torque for the command torque can be achieved. Thus, it is possible to effectively improve the accuracy of the driving torque distributed to the left second drive wheel and the right second drive wheel of the vehicle. Further, compared to the conventional control in which the entire command torque value is determined based on the lower limit value, the command value of the driving torque can be prevented from becoming large as a whole, thereby effectively preventing the driving torque more than necessary from being distributed to the left and right second drive wheels.

In addition, in this torque distribution control device for the four-wheel drive vehicle, when controlling the command values of the driving torque to be the predetermined lower limit values as described above, if the command value of the left-right sum torque, which is the sum of the command values of the torque distributed to the left second wheel and the right second wheel, falls below the predetermined lower limit value, this predetermined lower limit value is changed to the command value of the left-right sum torque. If the above-mentioned predetermined lower limit value is adopted as it is even when the command value of the left-right sum torque falls below the above-described predetermined lower limit, the driving torque is transmitted to the second drive wheels also in a running condition of the vehicle (for example, when the accelerator is off) in which the command value of the driving torque distributed to the second drive wheels of the first drive wheels and the second drive wheels (the front-rear distribution amount) is very small or substantially zero. This might affect fuel consumption (fuel consumption rate) of the vehicle and durability of the device. On the contrary, according to the present invention, the driving torque can be prevented from being transmitted to the second drive wheels in the above-described running condition by changing the predetermined lower limit value to the command value of the left-right sum torque if the command value of the left-right sum torque is lower than the predetermined lower limit value. This can improve the fuel consumption (fuel consumption rate) of the vehicle and the durability of the device.

Further, in the torque distribution control device for the four-wheel drive vehicle, the control device (Ua) may control a difference ($\Delta Tq$) between a command value (LTq) of the left driving torque and a command value (RTq) of the right driving torque to be constant.

According to this configuration, by controlling the difference between the command values of the driving torque to be constant, an appropriate difference in driving torque can be provided according to demand values of driving forces of the left second drive wheel and the right second drive wheel, thereby providing a more appropriate driving force distribution control.

Further, in the torque distribution control device for the four-wheel drive vehicle, the control device (Ua) may perform a control so that if one of the command value (LTq) of the left driving torque and the command value (RTq) of the right driving torque falls below the predetermined lower limit value (L1=LTq1 or RTq1), the difference ($\Delta LTq$ or $\Delta RTq$) between the one of the command value (LTq) of the left driving torque and the command value (RTq) of the right driving torque and the predetermined lower limit value is added to the other of the command value (LTq) of the left driving torque and the command value (RTq) of the right driving torque.

According to this configuration, by adding the difference between the command values of the driving torque of the one of the left and right second drive wheels and the predetermined lower limit value to the command value of the driving torque of the other thereof, the difference between the command value of the driving torque of the one of the second drive wheels and the command value of the driving torque of the other of the second drive wheels can be secured while preventing the command value of the driving torque of the one of the second drive wheels from falling below the predetermined lower limit value. Therefore, while the command value of the driving torque is prevented from becoming small below the limit, an appropriate difference in driving torque can be provided according to the demand values of the driving forces of the left second wheel and the right second wheel, whereby a more appropriate driving force distribution control can be performed.

Further, a third embodiment of the present invention is characterized in the following way. Namely, in a vehicle in which ones of front wheels (WFL, WFR) are first drive wheels (corresponding to main drive wheels in the embodiment, which will be described later) and the others thereof are second drive wheels (corresponding to auxiliary drive wheels in the embodiment, which will be described later), a torque distribution control device includes a front-rear torque distribution device (14) for distributing and transmitting first drive wheel torque and second drive wheel torque, as front-rear distribution driving torque, respectively to the first drive wheels and the second drive wheels, a left-right torque distribution device (16) for distributing and transmitting left driving torque and right driving torque, as left-right distribution torque, respectively to a left second drive wheel and a right second drive wheel, which are respectively left and right ones of the second drive wheels, and a control device (Ua) for controlling the first drive wheel torque and the second drive wheel torque distributed using the front-rear torque distribution device and the left driving torque and the right driving torque distributed using the left-right torque distribution device. If the second drive wheel torque, which is a sum of the left driving torque and the right driving torque, exceeds a command value thereof due to change in difference between a command value of the left driving torque and a command value of the right driving torque, the control device (Ua) performs, according to a running condition of the vehicle, selectively either a left-right difference priority control that prioritizes to make a difference between the left driving torque and the right driving torque follow the command value thereof, or a left-right sum priority control that prioritizes to make the sum of the first drive wheel torque and the second drive wheel torque follow the command value thereof.

According to this torque distribution control device for the four-wheel drive vehicle, if the second driving torque (front-rear distribution driving torque) distributed to the second drive wheel exceeds the command value thereof due to the change in difference (left-right difference) between the command values (command values of the left-right distribution driving torque) of the right driving torque and the left driving torque distributed to each of the left and right second drive wheels, either the above-mentioned left-right difference priority control or the left-right sum priority control is selectively performed according to the running condition of the vehicle. Thus, an optimal torque distribution control can be performed when performing the front-rear and left-right torque distribution controls. Therefore, a behavior of the vehicle can be effectively prevented from becoming unstable, and thus the running condition can be improved.

Further, in this torque distribution control device, the left-right difference priority control may be performed in such a manner that if one of the command value of the left driving torque and the command value of the right driving torque falls below a lower limit value, a shortfall below this lower limit value is added to the other of the command value of the left driving torque and the command value of the right driving torque, or if one of the command value of the left driving torque and the command value of the right driving torque exceeds a predetermined upper limit value, an amount exceeding this upper limit value is subtracted from the other of the command value of the left driving torque and the command value of the right driving torque.

Alternatively, the left-right sum priority control may be performed in such a manner that if one of the command value of the left driving torque and the command value of the right driving torque falls below the predetermined lower limit value, the shortfall below this lower limit value is subtracted from the other of the command value of the left driving torque and the command value of the right driving torque, or if one of the command value of the left driving torque and the command value of the right driving torque exceeds the predetermined upper limit value, the excess of this upper limit value is added to the other of the command value of the left driving torque and the command value of the right driving torque.

According to these configurations, if the one of the command value of the left driving torque and the command value of the right driving torque falls below or exceeds the predetermined limit value, the control is performed so as to add or subtract the amount below or above the limit value to or from the other of the command value of the left driving torque and the command value of the right driving torque. Consequently, the difference (left-right difference) between the left driving torque and the right driving torque or the difference (front-rear difference) between the first driving torque and the second driving torque can be maintained if the one of the command value of the left driving torque and the command value of the right driving torque exceeds or falls below the predetermined limit value. This enables a more optimal torque distribution control.

Further, this torque distribution control device includes, as means for determining a running condition of the vehicle, a longitudinal acceleration determination means for determining longitudinal acceleration (GH) of the vehicle and a lateral acceleration determination means for determining lateral acceleration (GE) thereof. The control device may perform the left-right difference priority control in a running condition where the longitudinal acceleration of the vehicle is relatively small and the lateral acceleration thereof is relatively large, and the left-right sum priority control in a running condition where the longitudinal acceleration of the vehicle is relatively large and the lateral acceleration thereof is relatively small.

According to this configuration, if the second drive wheel torque distributed to the second drive wheels using the front-rear torque distribution device exceeds the command value thereof, the priority is changeable according to a running condition of the vehicle as to which is preferentially performed, the above-described left-right difference priority control that prioritizes the left-right difference by adding a deficiency of the left-right distribution driving torque to a distribution amount to the left or right drive wheel on the opposite side, or the above-described left-right sum priority control that prioritizes the front-rear difference (front-rear distribution) by subtracting the deficiency of the left-right distribution driving torque from the distribution amount to the left or drive wheel on the opposite side. Therefore, a more optimal distribution control of driving torque can be performed according to a running condition of the vehicle.

It should be noted that the bracketed reference numerals are examples of the elements of the embodiments described later.

Effect of the Invention

According to the present invention, the command value (command torque) of the driving torque distributed to the left and right wheels can be prevented from being zero or close to zero while realizing an optimal torque distribution control, thereby effectively improving the accuracy of the driving torque distributed to the left and right wheels. Further, in the running condition of the vehicle in which the command value of the driving torque distributed to the second drive wheels is very small or substantially zero, the driving torque can be prevented from being transmitted to the second drive wheels, thereby improving the fuel consumption (fuel consumption rate) of the vehicle and the durability of the device. Also, by enabling to perform a more optimal torque distribution control when performing the front-rear and left-right driving torque distribution controls, the behavior of the vehicle can be effectively prevented from becoming unstable, and thus the running performance can be improved.

DESCRIPTION OF THE EMBODIMENTS

Embodiments of the present invention will be described as below with reference to the accompanying drawings.

Figure 1:
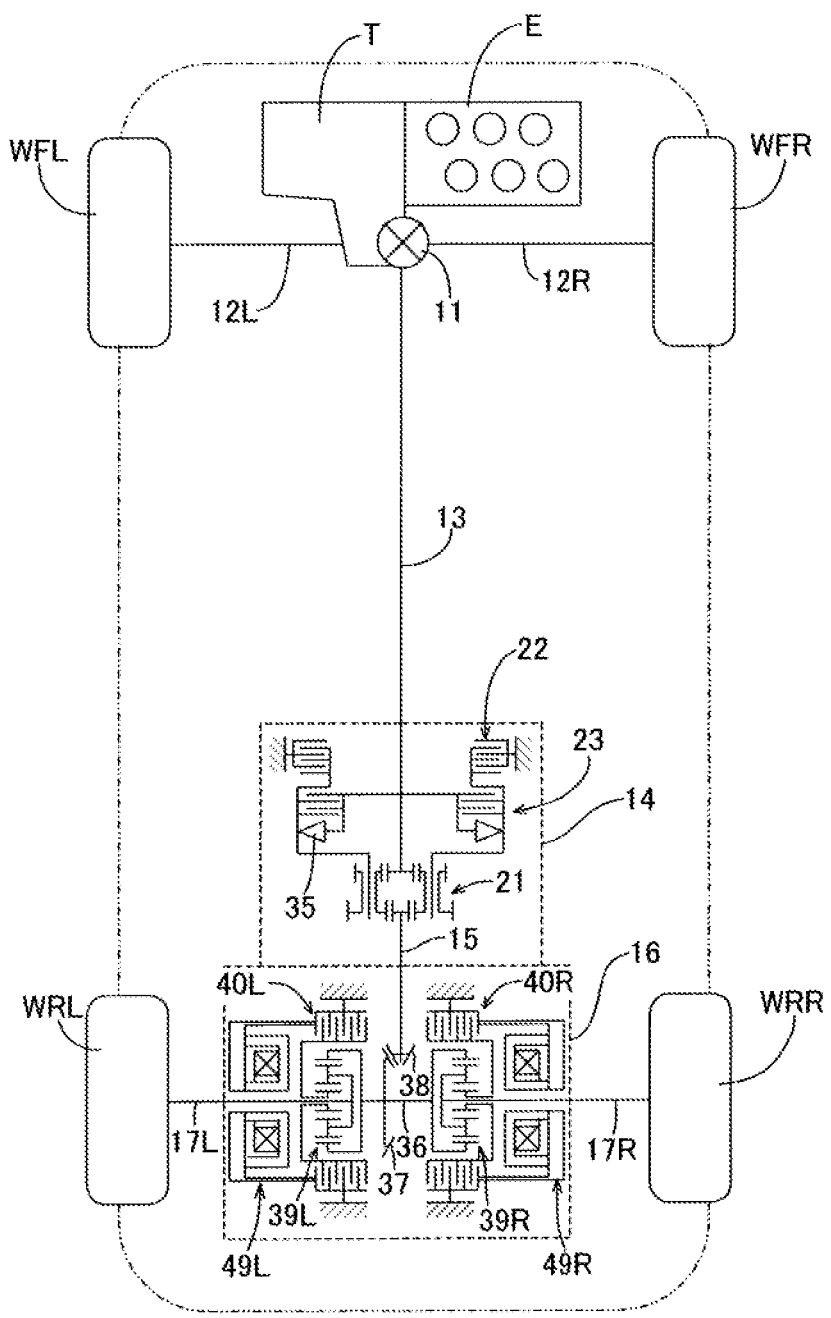
FIG. 1 is a view showing a driving force transmission system of a vehicle according to an embodiment of the present invention.
Figure 2:
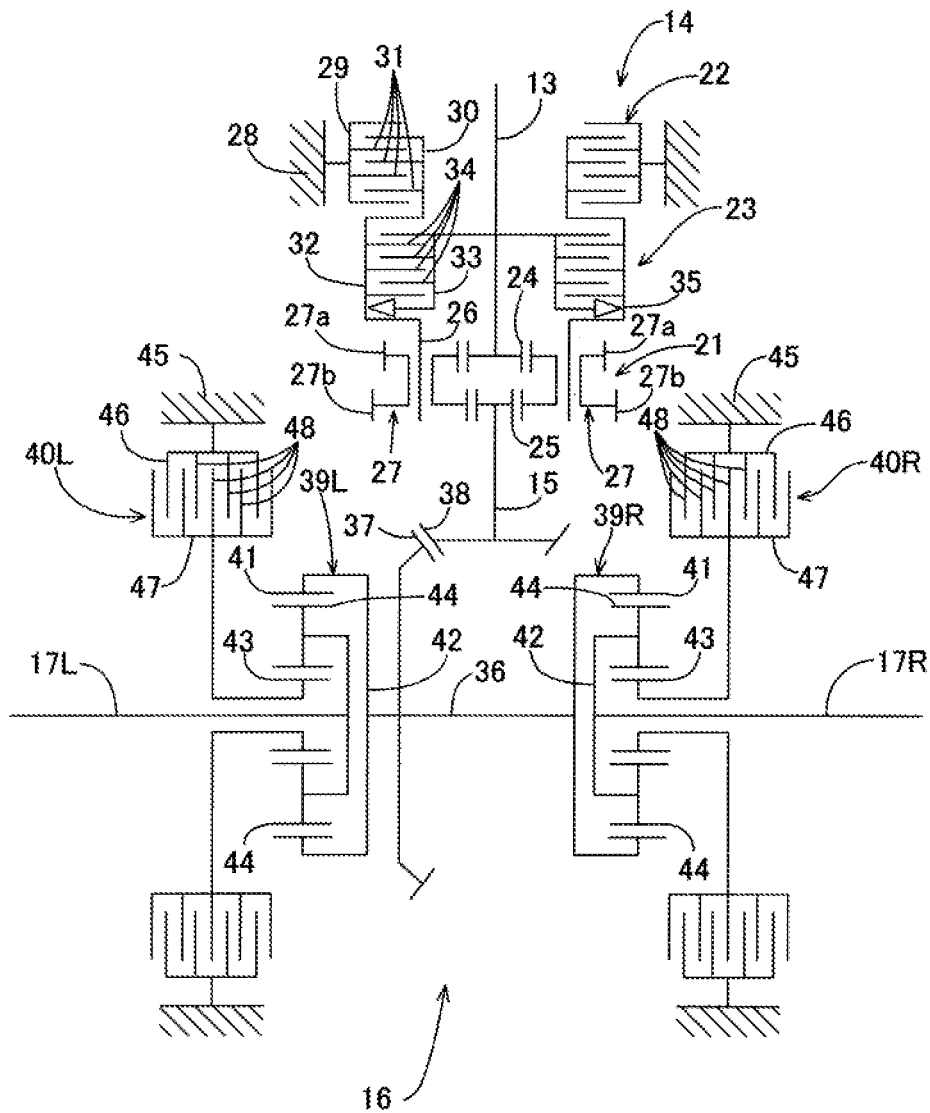
FIG. 2 is an enlarged view showing an acceleration device and a rear differential gear.

FIG. 1 is a view showing a driving force transmission system of a vehicle according to one embodiment of the present invention. FIG. 2 is an enlarged view of an acceleration device and a rear differential gear. As shown in FIG. 1, the vehicle of the first embodiment to which the present invention is applied is a four-wheel vehicle including left and right front wheels WFL, WFR as main drive wheels (first drive wheels) and left and right rear wheels WRL, WRR as auxiliary drive wheels (second drive wheels). The left and right front wheels WFL, WFR are basically always driven when the vehicle is running, and the left and right rear wheels WRL, WRR are driven appropriately according to a running state of the vehicle.

An automatic transmission T is connected to an engine E mounted horizontally on a front of a vehicle body. The automatic transmission T is connected to the left and right front wheels WFL, WFR via a front differential gear 11 and left and right front drive shafts 12L, 12R. The front differential gear 11 is connected to the left and right rear wheels WRL, WRR via a transfer (not shown in the figure), a front propeller shaft 13, an acceleration device 14, a rear propeller shaft 15, a rear differential gear 16, and left and right rear drive shafts 17L, 17R.

As shown in FIG. 2, the acceleration device 14 includes a planetary gear mechanism 21, an acceleration clutch 22 and a direct coupling clutch 23.

The planetary gear mechanism 21 includes an input-side sun gear 24 fixed to a rear end of the front propeller shaft 13, an output-side sun gear 25 fixed to a front end of the rear propeller shaft 15, a carrier 26 and a plurality of double pinions 27 supported by the carrier 26. Each of the plurality of double pinions 27 integrally includes an input-side pinion 27a and an output-side pinion 27b. The number of teeth of the output-side pinion 27b is set larger than the number of teeth of the input-side pinion 27a, and accordingly, the number of teeth of the sun gear 25 is set smaller than the number of teeth of the input-side sun gear 24.

The acceleration clutch 22 of hydraulic multi-disc type is composed of a clutch outer 29 fixed to a housing 28 and a clutch inner 30 positioned inside the clutch outer 29 that are opposed to each other via a plurality of friction engagement elements 31. When the plurality of frictional engagement elements 31 are engaged by supplying hydraulic pressure, the clutch inner 30 is engaged with the clutch outer 29 and constrained unrotatably to the housing 28.

The direct coupling clutch 23 of the hydraulic multi-disc type includes a clutch outer 32 integrated with the clutch inner 30 of the acceleration clutch 22 and the carrier 26 of the planetary gear mechanism 21, a clutch inner 33 integrated with the front propeller shaft 13, a plurality of frictional engagement elements 34 disposed between the clutch outer 32 and the clutch inner 33 and a one-way clutch 35 disposed between the clutch outer 32 and the clutch inner 33. When rotational speed of the clutch inner 33 exceeds rotational speed of the clutch outer 32, the one-way clutch 35 slips to interrupt transmission of driving force. When the plurality of frictional engagement elements 34 are engaged by supplying hydraulic pressure, the clutch outer 32 is engaged with the clutch inner 33, and thus the front propeller shaft 13 is integrated with the carrier 26 of the planetary gear mechanism 21.

Therefore, when the acceleration clutch 22 is engaged and the direct coupling clutch 23 is disengaged, the carrier 26 of the planetary gear mechanism 21 is constrained unrotatably to the housing 28. Thus, the rotational speed of the front propeller shaft 13 is increased at a speed increase ratio (for example, 1.05) determined by the number of teeth of the input-side sun gear 24, the output-side sun gear 25 and the double pinion 27 and then output to the rear propeller shaft 15.

On the contrary, when the acceleration clutch 22 is disengaged and the direct coupling clutch 23 is engaged, the input-side sun gear 24 of the planetary gear mechanism 21 and the carrier 26 are integrated into a locked state. Thus, the rotation of the front propeller shaft 13 is output directly to the rear propeller shaft 15.

As the rear differential gear 16 has a substantially mirror symmetrical structure across a center surface of a vehicle body, a structure of the left side portion of the center surface of the vehicle body will be described as representing the whole structure thereof. It should be noted that symmetrical components are distinguished by attaching symbols L and R to the symbols thereof on the drawings. Also in the following description, when it is necessary to distinguish between left and right, symbols L and R will be attached.

A driven bevel gear 37 fixed to an intermediate portion of an input shaft 36 coaxially disposed between opposing ends of the left and right rear drive shafts 17L, 17R meshes with a drive bevel gear 38 fixed to a rear end of the rear propeller shaft 15. A planetary gear mechanism 39L and a torque distribution clutch 40L of electromagnetic multi-disc type are disposed between the input shaft 36 and the left rear drive shaft 17L.

The planetary gear mechanism 39 includes a ring gear 41, a carrier 42, a sun gear 43 and a plurality of pinions 44 supported by the carrier 42 and meshing simultaneously with the ring gear 41 and the sun gear 43. The ring gear 41 is coupled to a left end of the input shaft 36, and the carrier 42 is coupled to a right end of the left rear drive shaft 17L.

The torque distribution clutch 40 includes a clutch outer 46 fixed to a housing 45, a clutch inner 47 coupled to the sun gear 43 of the planetary gear mechanism 39, a plurality of frictional engagement elements 48 disposed between the clutch outer 46 and the clutch inner 47, and an electromagnetic actuator 49 (see FIG. 1) for integrally coupling the clutch outer 46 and the clutch inner 47 to each other by engaging the friction engagement elements 48 with each other.

In a state where the electromagnetic actuator 49 is OFF, the torque distribution clutch 40 is disengaged to enable the sun gear 43 to freely rotate, so that no driving force of the input shaft 36 is transmitted to the left rear drive shaft 17L. On the other hand, in a state where the electromagnetic actuator 49 is ON and the torque distribution clutch 40 is engaged, the sun gear 43 is constrained unrotatably to the housing 45, so that the driving force of the input shaft 36 is transmitted to the left rear drive shaft 17L.

At this time, by changing current supplied to the electromagnetic actuator 49 to change a slip amount of the torque distribution clutch 40, torque transmitted from the input shaft 36 to the left rear drive shaft 17L can be changed continuously.

Therefore, by changing an engagement force of the left and right torque distribution clutches 40L, 40R of the rear differential gear 16, a ratio of torque distributed between the front wheels WFL, WFR and the rear wheels WRL, WRR can be arbitrarily controlled, and a ratio of torque distributed between the left and right rear wheels WRL, WRR can be arbitrarily controlled.

Figure 3:
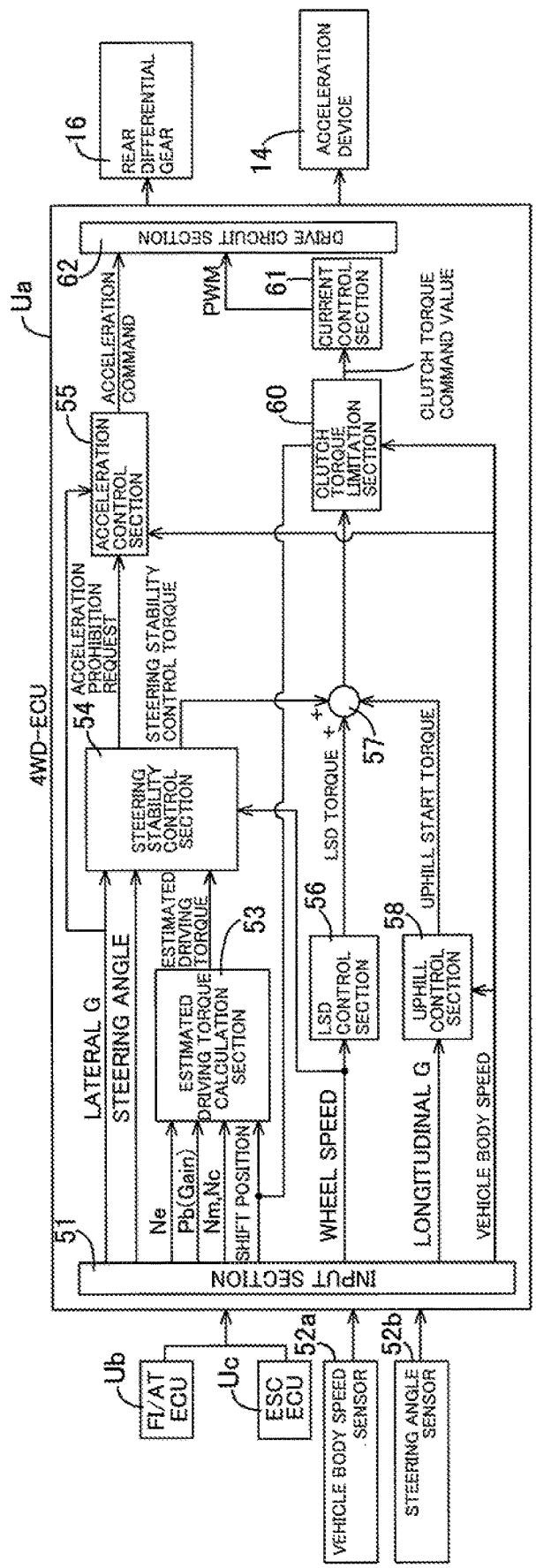
FIG. 3 is a block diagram showing a configuration of a 4WD-ECU.

Next, a configuration of a 4WD electronic control unit (4WD-ECU) Ua for controlling operations of the acceleration device 14 and the rear differential gear 16 will be described with reference to FIG. 3

To an input section 51 of the 4WD electronic control unit Ua, an FI/AT electronic control unit Ub for controlling operations of the engine E and the automatic transmission T and an ESC electronic control unit Uc for controlling an operation of a vehicle behavior stabilizing system are connected via a CAN. Also, a vehicle body speed sensor 52a for detecting vehicle body speed, for example, from rotational speed of a gear of the automatic transmission T and a steering angle sensor 52b for detecting a steering angle of a steering wheel are connected thereto.

Signals input from the FI/AT electronic control unit Ub to the input section 51 include engine speed, intake negative pressure, rotational speed of a main shaft and a counter shaft of the automatic transmission T, a shift position of the automatic transmission T, and the like. Signals input from the ESC electronic control unit Uc to the input section 51 include wheel speed of the front wheels WFL, WFR and the rear wheels WRL, WRR, lateral acceleration of the vehicle, longitudinal acceleration of the vehicle, and the like.

An estimated driving torque calculation section 53 calculates estimated driving torque output from the transmission T on the basis of the engine speed and the intake negative pressure (or intake air flow rate) input from the input section 51, a gear ratio estimated from the rotational speed of the main shaft and the counter shaft, a speed ratio of a torque converter, efficiency in each shift gear, and the like. It should be noted that instead of estimating the gear ratio from the rotational speed of the main shaft and the counter shaft, a gear ratio of the shift position detected by a shift position sensor may be used.

A steering stability control section 54 calculates steering stability control torque distributed to the left and right rear wheels WRL, WRR on the basis of the estimated driving torque calculated by the estimated driving torque calculation section 53, and the lateral acceleration, the steering angle and the wheel speed input from the input section 51. For example, a vehicle behavior is determined to be in an unstable state when a slip angle of the vehicle is equal to or larger than a predetermined value. Then, torque distributed to the left and right rear wheels WRL, WRR is reduced by controlling the rear differential gear 16, and the vehicle behavior is stabilized by reducing the torque distributed to a turning outer wheel of the left and right rear wheels WRL, WRR.

In a case where the vehicle body speed is medium and the lateral acceleration is large, an acceleration control section 55 engages the acceleration clutch 22 of the acceleration device 14 to increase the rotational speed of the rear propeller shaft 15 compared to the rotational speed of the front propeller shaft 13, and distributes torque to the turning outer wheel of the left and right rear wheels WRL, WRR using the rear differential gear 16, thereby improving the turning performance of the vehicle while avoiding understeering thereof. In a case where the vehicle body speed is low or high and the lateral acceleration is small, the acceleration control section 55 engages the direct coupling clutch 23 of the acceleration device 14 to suspend increase in rotational speed of the rear propeller shaft 15 compared to the rotational speed of the front propeller shaft 13, and distributes torque to the turning outer wheel of the left and right rear wheels WRL, WRR using the rear differential gear 16, thereby securing stable turning performance.

In a case where the steering stability control section 54 outputs an acceleration prohibition request due to a possibility that the vehicle behavior might be disturbed when the acceleration is performed, any operation of the acceleration device 14 is prohibited.

An LSD control section 56 compares the wheel speed of the left and right front wheels WFL, WFR to the wheel speed of the left and right rear wheels WRL, WRR, and calculates LSD torque distributed to the rear wheels WRL, WRR according to a differential rotation between the front and rear wheels in a case where the front wheels WFL, WFR slip because at the time of vehicle start, a friction coefficient of a road surface on which the front wheels WFL, WFR grip is smaller than a friction coefficient of the road surface on which the rear wheels WRL, WRR grip, or in a case where main driving forces of the front wheels WFL, WFR are larger than auxiliary driving forces of the rear wheels WRL, WRR even if the friction coefficients of the road surface on which the four wheels grip are equal to each other. If the LSD torque is distributed to the rear wheels WRL, WRR by the rear differential gear 16, the slip of the front wheels WFL, WFR is released by that amount, whereby the vehicle can start smoothly.

An upward slope control section 58 compares actual longitudinal acceleration detected by the longitudinal acceleration sensor to estimated longitudinal acceleration obtained by differentiating the vehicle body speed, and thus calculates a climbing angle of the vehicle (an inclination angle of an upward slope of a road surface) and further calculates uphill start torque distributed to the rear wheels WRL, WRR using the rear differential gear 16 according to the climbing angle in order to increase climbing power at the time of vehicle start on the upward slope.

A torque addition section 57 adds up the steering stability control torque calculated by the steering stability control section 54, the LSD torque calculated by the LSD control section 56 and the uphill start torque calculated by the upward slope control section 58.

In order to prevent an excessive load from acting on the rear differential gear 16 at the time of switchback of the vehicle from backward to forward and thus reducing the durability of the vehicle, a clutch torque limitation section 60 limits an upper limit value of target torque transmitted to the rear wheels WRL, WRR by the rear differential gear 16.

A current control section 61 converts a clutch torque command value calculated by the clutch torque limitation section 60 into a current value (PWM value) supplied to the electromagnetic actuators 49L, 49R of the torque distribution clutches 40L, 40R of the rear differential gear 16.

Thus, a drive circuit section 62 controls an operation of the acceleration device 14 on the basis of an acceleration command output from the acceleration control section 55, and controls an operation of the rear differential gear 16 on the basis of the current value output from the current control section 61.

Here, a distribution control of driving torque distributed to the left rear wheel WRL and the right rear wheel WRR when the vehicle turns will be described. Normally, magnitude of torque of the left and right rear wheels WRL, WRR when the vehicle turns is generally controlled on the basis of a sum of left rear wheel torque and right rear wheel torque (hereinafter occasionally referred to as "first relation"), that is, a torque demand in the longitudinal direction, and a difference between the left rear wheel torque and the right rear wheel torque (hereinafter occasionally referred to as "second relation"), that is, a torque demand in the turning direction.

The torque distribution control in this case will be described using mathematical expressions. Let target torque of the left rear wheel WRL be TT1, target torque of the right rear wheel WRR be TT2, total target torque of the left and right rear wheels WRL, WRR (the sum of the left rear wheel torque and the right rear wheel torque) be TRT, a target torque difference between the left and right rear wheels WRL, WRR (the difference between the left rear wheel torque and the right rear wheel torque) be ΔTT. Then, the following expressions (1) and (2) are established respectively from the first and second relations.

$$TT1+TT2=TRT \quad (1)$$

$$TT1-TT2=\Delta TT \quad (2)$$

It should be noted that ΔTT is expressed by the following equation (3) if target yaw moment (taking the clockwise direction to be positive) is YMT, a wheel radius is r, and a tread width (a distance between the left and right rear wheels WRL, WRR) is Tr.

$$\Delta TT=2*r*YMT/Tr \quad (3)$$

Therefore, the target torque TT 1 of the left rear wheel WRL and the target torque TT 2 of the right rear wheel WRR are uniquely determined from the above equations (1) and (2).

In this manner, based on the first relation and the second relation, the torque demand in the longitudinal direction and the torque demand in the turning direction can be satisfied, whereby the importance is attached to the running performance of the vehicle.

First Embodiment

Figure 4:
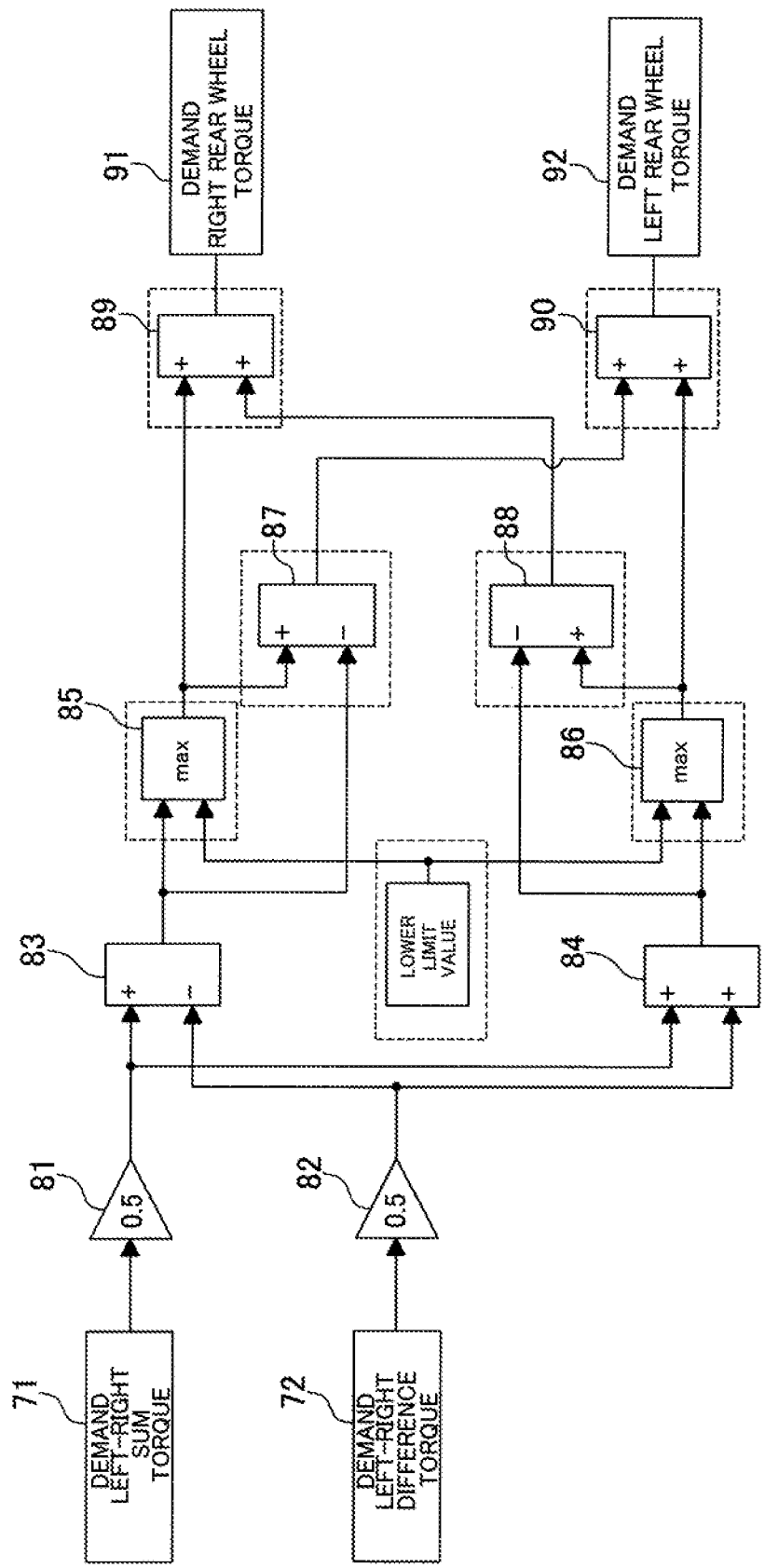
FIG. 4 is a block diagram showing a flow of processing in a torque distribution control according to a first embodiment.

FIG. 4 is a block diagram for describing a flow of processing in a torque distribution control according to the first embodiment of the present invention. In this torque distribution control, demand left-right sum torque (rear wheel shaft torque) 71 and demand left-right difference torque 72 are input and limited respectively in limit blocks 81, 82. Here, both become values of 0.5 (½) time of each torque. Thereafter, a difference calculation block 83 calculates a difference value between the demand left-right sum torque 71 and the demand left-right difference torque 72, and a sum calculation block 84 calculates a sum value of the demand left-right sum torque 71 and the demand left-right difference torque 72.

Thereafter, a first lower limit processing block 85 compares the above-described difference value calculated by the difference calculation block 83 to a lower limit value of preset demand torque in the left and right rear wheels WRL, WRR (corresponding to lower limit values LTq1, RTq1 in FIG. 5 to be described later), and then performs a processing (lower limit processing) for selecting a larger one. Namely, when the difference value between the demand left-right sum torque 71 and the demand left-right difference torque 72 is larger than this lower limit value, this difference value is selected. When the difference value between the demand left-right sum torque 71 and the demand left-right difference torque 72 is equal to or less than this lower limit value, this lower limit value is selected. Thereafter, a first deficiency calculation block 87 calculates a difference value between the difference value between the demand left-right sum torque 71 and the demand left-right difference torque 72 calculated by the above-described difference calculation block 83 and the value selected by the first lower limit processing block 85.

On the other hand, a second lower limit processing block 86 compares the above-described sum value calculated by the sum calculation block 84 to a lower limit value of a preset demand torque in the left and right rear wheels WRL, WRR (corresponding to lower limit values LTq1, RTq1 in FIG. 5 to be described), and then performs a processing (lower limit processing) for selecting a larger one. Namely, when the sum value of the demand left-right sum torque 71 and the demand left-right difference torque 72 is larger than the above-mentioned lower limit value, this sum value is selected. And, when the sum value of the demand left-right sum torque 71 and the demand left-right difference torque 72 is equal to or less than the above-mentioned lower limit value, this lower limit value is selected. Thereafter, a second deficiency amount calculation block 88 calculates a difference between the sum value of the demand left-right sum torque 71 and the demand left-right difference torque 72 calculated by the above-described sum calculation block 84 and the value selected by the second lower limit processing block 86.

Further, a demand right rear wheel torque calculation block 89 calculates demand right rear wheel torque 91 that is a sum value of the value selected by the above-described first lower limit processing block 85 and the value calculated by the second deficiency calculation block 88. Also, a demand left rear wheel torque calculation block 90 calculates demand left rear wheel torque 92 that is a sum value of the value selected by the above-described second lower limit processing block 86 and the value calculated by the second deficiency calculation block 88. The demand right rear wheel torque 91 and the demand left rear wheel torque 92 are to be command values (command torque) of driving torque distributed to the left and right rear wheels WRL, WRR (hereinafter simply referred to as "torque") in the torque distribution control of this embodiment.

Figure 5A:
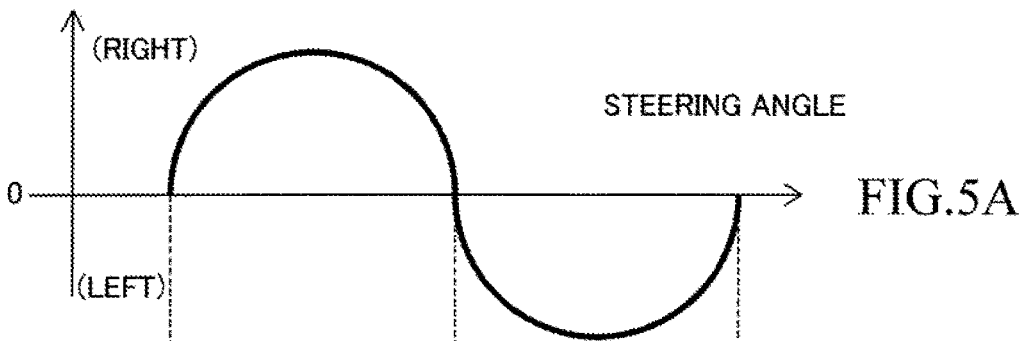
FIGS. 5A to 5C are views showing changes in command values of torque distributed to left and right rear wheels in a torque distribution control of a first embodiment.
Figure 5B:
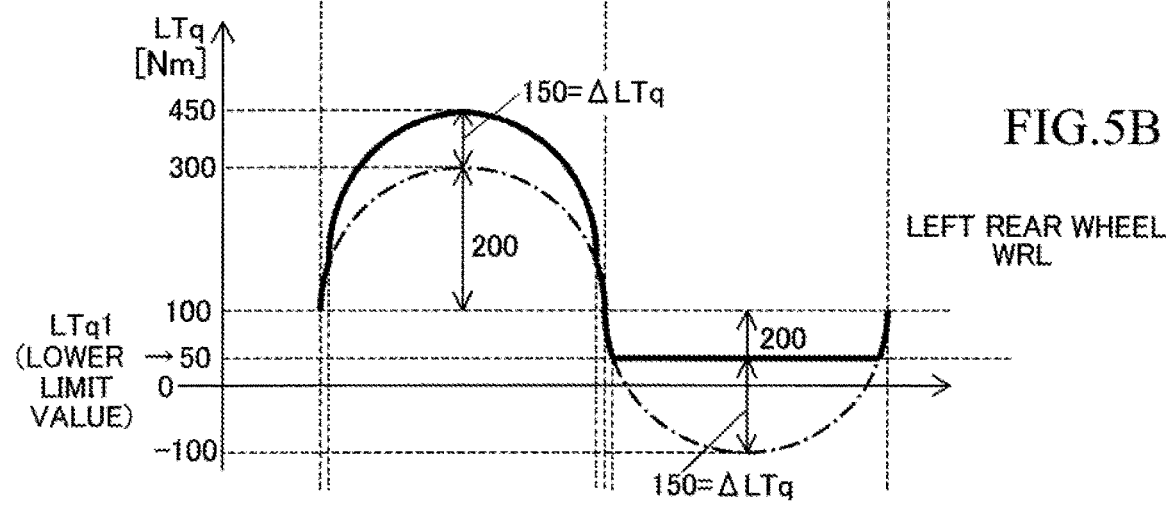
Figure 5C:
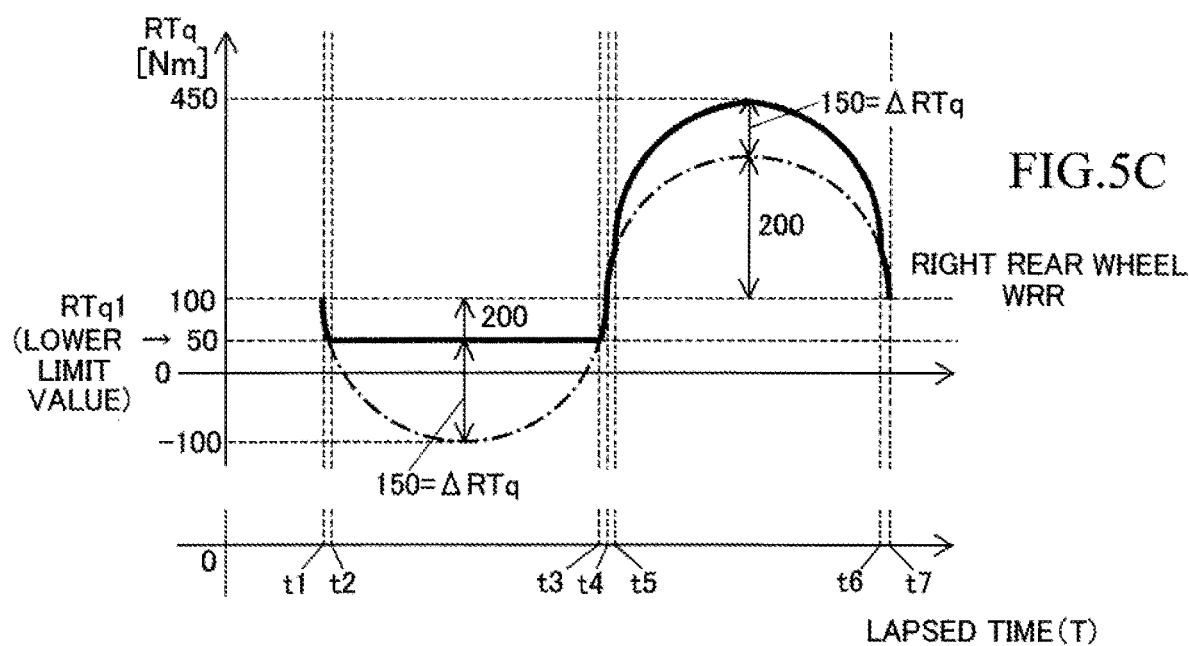

FIGS. 5A and 5B are views showing changes (with respect to elapsed time t) in the command values (command torque) of the torque distributed to the left and right rear wheels WRL, WRR in the torque distribution control of the first embodiment, of which FIG. 5A shows steering angles of the vehicle (steering angles of a steering wheel), FIG. 5B shows command values LTq [Nm] of the torque distributed to the left rear wheel WRL, and FIG. 5C shows command values RTq [Nm] of the torque distributed to the right rear wheel WRR. As shown in these figures, as the vehicle starts to turn right at time t1, the command torque LTq of the left rear wheel WRL gradually increases from LTq=100 [Nm]. On the other hand, the command torque RTq of the right rear wheel WRR gradually decreases from RTq=100 [Nm]. Then, the command torque RTq of the right rear wheel WRR becomes a lower limit value RTq1=50 [Nm] at time t2 to be maintained thereafter at a constant value RTq=the lower limit RTq1=50 [Nm] until time t3. Namely, a basic value (indicated by the alternate long and short dash line) of the command torque of the rear right wheel WRR is below the lower limit value RTq1=50 [Nm] from the time t2 to the time t3. Therefore, during that time, the lower limit value RTq1=50 [Nm] is selected without selecting the basic value (indicated by the alternate long and short dash line) as the command torque RTq of the right rear wheel WRR. On the other hand, the command torque LTq of the left rear wheel WRL is a value obtained by adding a predetermined addition value ΔLTq (≤150 [Nm]) to a basic value of the command torque LTq from the time t2 to the time t3. The addition value ΔLTq added here corresponds to a difference ΔRTq between the basic value and the lower limit torque RTq1 of the command torque RTq in the right rear wheel WRR.

Also, at time t4, the vehicle makes transition from right turn to left turn, so that thereafter the command torque LTq of the left rear wheel WRL decreases from LTq=100 [Nm]. On the other hand, the command torque RTq of the right rear wheel WRR increases from RTq=100 [Nm]. Then, the command torque LTq of the left rear wheel WRL becomes the lower limit value LTq1=50 [Nm] at time t5 to be maintained thereafter at a constant value of the lower limit value LTq1=50 [Nm] until time t6. Namely, the basic value (indicated by the alternate long and short dash line) of the command torque LTq of the left rear wheel WRL is below the lower limit value LTq1=50 [Nm] from the time t5 to the time t6. Therefore, during that time, the lower limit value LTq1=50 [Nm] is selected as the command torque LTq of the left rear wheel WRL without selecting the basic value (indicated by the alternate long and short dash line). On the other hand, the command torque RTq of the right rear wheel WRR is a value obtained by adding a predetermined addition value ΔRTq (≤150 Nm) to the basic command value RTq from the time t5 to the time t6. This addition value ΔRTq added here corresponds to a difference ΔLTq between the basic value and the lower limit torque LTq1 of the command torque LTq in the left rear wheel WRL.

In this manner, by adding a shortfall of torque below the lower limit torque LTq1, RTq1 in one of the left rear wheel WRL and the right rear wheel WRR to the command torque LTq, RTq of the other of the left rear wheel WRL and the right rear wheel WRR, while the command torque of the one of the left rear wheel WRL and the right rear wheel WRR can be prevented from falling below the preset lower limit torque LTq1, RTq1, the difference between the command torque of the left rear wheel WRL and the command torque of the right rear wheel WRR can be always maintained constant or above a certain level.

Namely, in the torque distribution control of the left and right rear wheels WRL, WRR of the present embodiment, when performing torque vectoring of the left and right rear wheels (auxiliary drive wheels) WRL, WRR using a system provided with the rear differential gear 16 of two-clutch type, the lower limit (lower limit value LTq1, RTq1) is provided to the command value of driving torque so that no driving force of one of the left and right wheels becomes zero or close to zero due to a left-right difference demand of driving force. Further, by performing a control to add the shortfall of command torque below the predetermined lower limit value LTq1, RTq1 to the command torque of the rear wheel on the opposite side, the difference in the command torque between the left and right rear wheels WRL, WRR is maintained.

As described above, according to the torque distribution control device for the vehicle of the present embodiment, if the command value LTq of the driving torque distributed to the left rear wheel WRL using the left clutch 40L and the command value RTq of the driving torque distributed to the right rear wheel WRR using the right clutch 40R are lower respectively than the lower limit values LTq1, RTq1, the command values LTq, RTq of the driving torque can be prevented from temporarily becoming zero or close to zero by controlling the command values LTq, RTq of the driving torque to be the lower limit values LTq1, RTq1. This enables to prevent a delay in the rise of the actual torque for the command torque LTq, RTq, thereby improving the torque response. Further, by preventing the command values LTq, RTq of the driving torque from temporarily becoming zero or close to zero, the response waveform of the actual torque for the command torque LTq, RTq can be made linear or nearly linear, whereby the accuracy of the actual torque for the command torque LTq, RTq can be achieved. Thus, the accuracy of the driving torque distributed to the left and right rear wheels WRL, WRR can be improved effectively. Further, compared to the conventional control in which an entire command torque value is determined based on a preset lower limit value, the command values LTq, RTq of the driving torque can be prevented from becoming large as a whole, thereby effectively preventing the driving torque more than necessary from being distributed to the left and right rear wheels WRL, WRR.

Further, in this torque distribution control device for the vehicle, the difference ΔTq between the command value LTq of the driving torque distributed to the left rear wheel WRL using the left clutch 40L and the command value RTq of the driving torque distributed to the right rear wheel WRR using the right clutch 40R is controlled to be a constant value.

According to this configuration, by controlling the difference ΔTq between the command values of the driving torque to be a constant value, an appropriate difference in driving torque can be provided according to demand values of driving forces for the left and right rear wheels WRL, WRR, thereby enabling a more appropriate driving force distribution control.

Further, in the torque distribution control device for this vehicle, if the command value LTq, RTq of the driving torque distributed to one of the left rear wheel WRL and the right rear wheel WRR using one of the left clutch 40L and the right clutch 40R falls below the predetermined lower limit value LTq1, RTq1, a control is performed so that the difference ΔLTq, ΔRTq between the command value LTq, RTq of the driving torque and the predetermined lower limit value LTq1, RTq1 is added to the command value LTq, RTq of the driving torque distributed to the other of the left and right rear wheels WRL, WRR using the other of the left and right clutches 40L, 40R.

According to this configuration, by adding the difference ΔLTq, ΔRTq between the command value LTq, RTq of the driving torque of one of the left and right clutch 40L, 40R and the lower limit value LTq1, RTq1 to the command value LTq, RTq of the driving torque of the other clutch 40L, 40R, while the command value LTq, RTq of the driving torque of the one clutch 40L, 40R is prevented from falling below the lower limit value LTq1, RTq1, the difference between the value LTq, RTq of the driving torque of the one clutch 40L, 40R and the command value LTq1, RTq1 of the driving torque of the other clutch 40L, 40R can be secured. Therefore, while the command value LTq, RTq of the driving torque is prevented from reaching a small value below the limit, the appropriate difference the command values LTq, RTq of the driving torque can be provided according to the demand values of the driving forces for the left and right rear wheels WRL, WRR, so that the more appropriate driving force distribution control can be performed.

Figure 6:
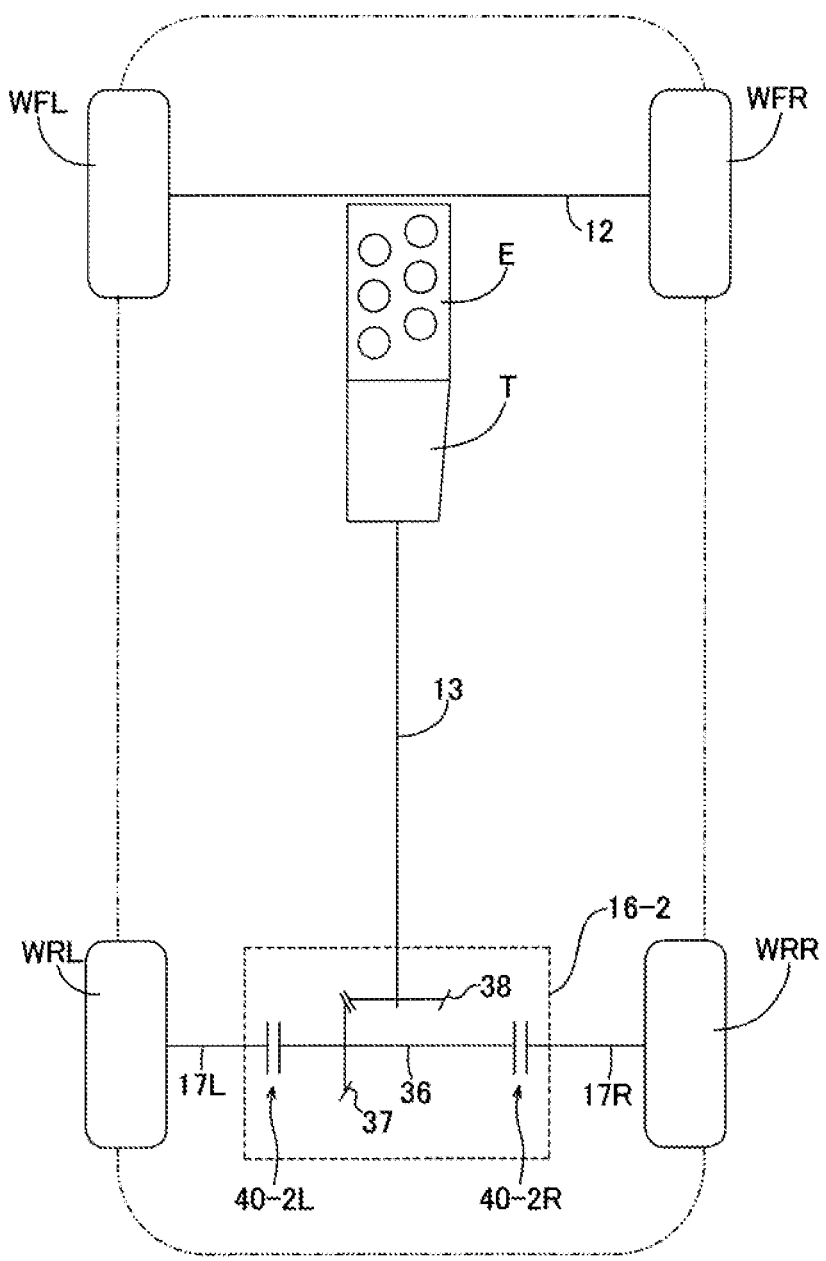
FIG. 6 is a view showing another driving force transmission system of a vehicle that performs a torque distribution control according to a first embodiment.

FIG. 6 is a view showing another configuration example of the driving force transmission system of the vehicle that performs the torque distribution control of the first embodiment. The vehicle shown in the figure is a rear wheel drive (FR) vehicle in which power from the engine E is transmitted only to the left and right rear wheels WRL, WRR. Namely, the automatic transmission T is connected to the engine E vertically mounted on the front of the vehicle body. The automatic transmission T is connected to the left and right rear wheels WRL, WRR via the front propeller shaft 13, the acceleration device 14, the rear propeller shaft 15, rear differential gears 16-2 (left and right clutches 40-2L, 40-2R) and the left and right rear drive shafts 17L, 17R. By the torque distribution control of the present embodiment, the torque distributed to the left and right rear wheels WRL, WRR are controlled using the left and right clutches 40-2L, 40-2R. Contents of the torque distribution control are the same as those described above. In this manner, the vehicle to which the torque distribution control of the first embodiment is applied may be the rear wheel drive vehicle.

Figure 7:
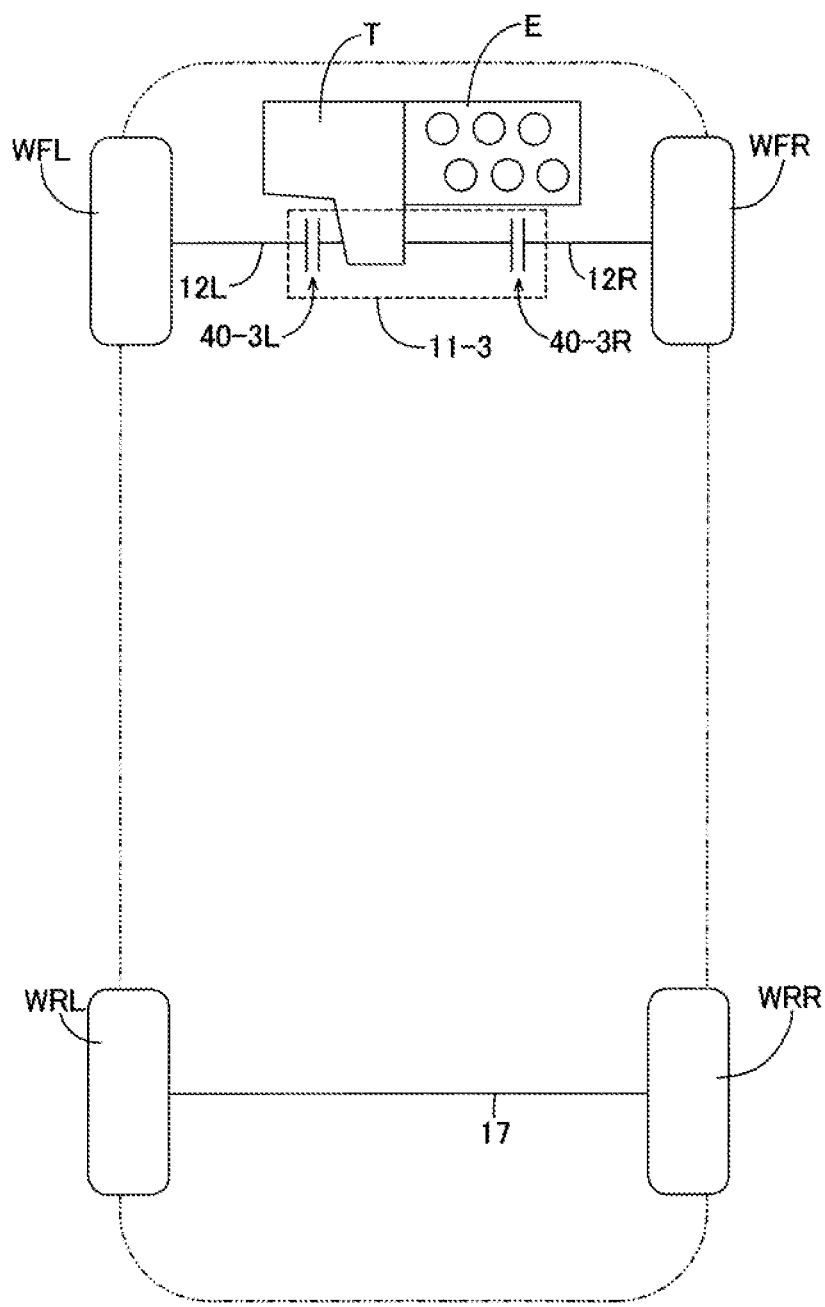
FIG. 7 is a view showing still another driving force transmission system of a vehicle that performs a torque distribution control according to a first embodiment.

FIG. 7 is a view showing still another configuration example of the driving force transmission system of the vehicle that performs the torque distribution control of the first embodiment. The vehicle shown in the figure is a front wheel drive (FF) vehicle in which power from the engine E is transmitted only to the left and right front wheels WFL, WFR. Namely, the automatic transmission T is connected to the engine E mounted horizontally on the front of the vehicle body. The automatic transmission T is connected to the left and right front wheels WFL, WFR via front differential gears 11-3 (left and right clutches 40-3L, 40-3R) and the left and right front drive shafts 12L, 12R.

Namely, the left-right clutches 40-3L, 40-3R as torque distribution clutches are disposed respectively on paths for transmitting power to the left and right front drive shafts 12L, 12R. By the torque distribution control of the present embodiment, the torque distributed to the left and right front wheels WFL, WFR is controlled using the left and right clutches 40-3L, 40-3R. Contents of the torque distribution control is the same as those above. In this manner, the vehicle to which the torque distribution control of the first embodiment is applied may be the front wheel drive vehicle.

The particular configurations of the driving force transmission systems shown in FIGS. 1, 6 and 7 are merely examples. The configuration of the driving force transmission system for performing the driving force distribution control according to the present embodiment includes the torque distribution device for distributing the driving torque transmitted to one and the other of the left and right wheels according to a running condition of the vehicle. As far as a general configuration of this torque distribution device includes one clutch provided on a path for transmitting driving torque to one of the left and right wheels and the other clutch provided on a path for transmitting driving torque to the other of the left and right wheels, a specific configuration thereof may be different from those shown in FIGS. 1, 6 and 7.

Second Embodiment

Figure 8:
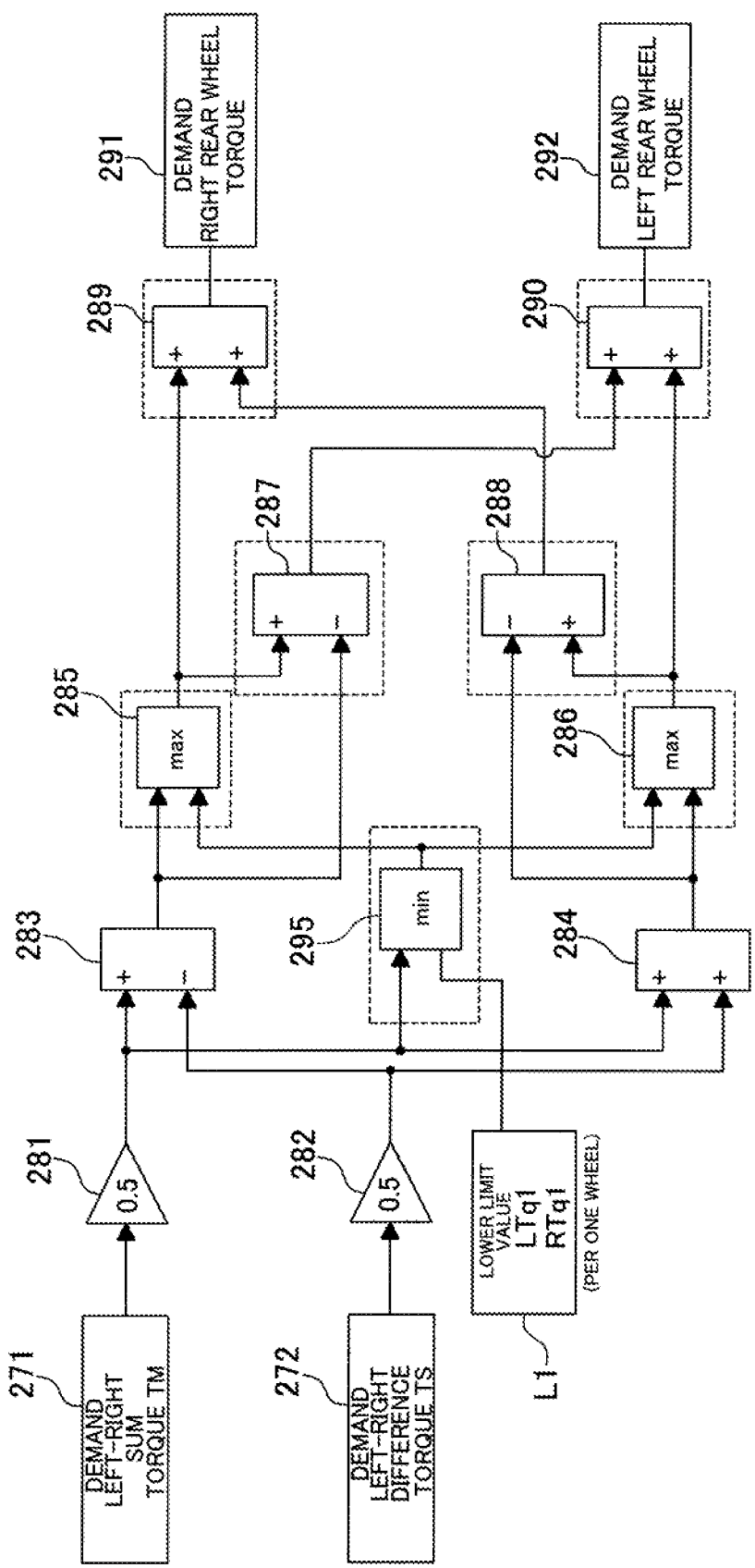
FIG. 8 is a block diagram showing a flow of processing in a torque distribution control of a second embodiment.

FIG. 8 is a block diagram for describing the flow of processing in a torque distribution control of the second embodiment. In this torque distribution control, demand left-right sum torque (rear wheel shaft torque) TM (271) and demand left-right difference torque TS (272) are input and limited respectively in limit blocks 281, 282. Here, both become values of 0.5 (½) time of each torque. Thereafter, a difference calculation block 283 calculates a difference value between the demand left-right sum torque TM and the demand left-right difference torque TS, and a sum calculation block 284 calculates a sum value of the demand left-right sum torque TM and the demand left-right difference torque TS.

Further, a lower limit value calculation block 295 compares the demand left-right sum torque TM limited in the limit block 281 to a lower limit value (lower limit value per one wheel) L1 of a preset demand torque in each of the left and right rear wheels WRL, WRR (corresponding to a lower limit value LTq1, RTq1 shown in FIGS. 9 and 10, which will be described later), whereby a lower value thereof is output. Namely, when the lower limit value L1 is smaller than the demand left-right sum torque TM, the lower limit value L1 is output as the output value from the lower limit value calculation block 295, and when the demand left-right sum torque TM is smaller than the lower limit value L1, the demand left-right sum torque TM is output as the output value from the lower limit value calculation block 295.

Namely, when the value of the demand left-right sum torque TM decreases, the lower limit value calculation block 295 performs a control to change the lower limit value L1 (LTq1, RTq1) of the preset demand torque in the left and right rear wheels WRL, WRR to the value of this demand left-right sum torque (rear wheel shaft torque) TM.

Thereafter, a first lower limit processing block 285 compares the above-described difference value calculated by the difference calculation block 283 to the output value from the lower limit value calculation block 295, and then performs a processing (lower limit processing) for selecting a larger one. Namely, when the difference value between the demand left-right sum torque TM and the demand left-right difference torque TS is larger than the output value from the lower limit value calculation block 295, this difference value is selected. And, when the difference value between the demand left-right sum torque TM and the demand left-right difference torque TS is equal to or less than the output value from the lower limit value calculation block 295, the output value from the lower limit value calculation block 295 is selected. Thereafter, a first deficiency calculation block 287 calculates a difference value between the difference value between the demand left-right sum torque TM and the demand left-right difference torque TS calculated by the above-described difference calculation block 283 and the value selected by the first lower limit processing block 285.

On the other hand, a second lower limit processing block 286 compares the above-described sum value calculated by the sum calculation block 284 to the output value from the lower limit value calculation block 295, and then performs a processing (lower limit processing) for selecting a larger one. Namely, when the sum value of the demand left-right sum torque TM and the demand left-right difference torque TS is larger than the output value from the above-mentioned lower limit value calculation block 295, this sum value is selected. And, when the sum value of the demand left-right sum torque TM and the demand left-right difference torque TS is equal to or less than the output value from the above-mentioned lower limit value calculation block 295, this output value from the lower limit value calculation block 295 is selected. Thereafter, a second deficiency calculation block 288 calculates a difference between the sum value of the demand left-right sum torque TM and the demand left-right difference torque TS calculated by the above-described sum calculation block 284 and the value selected by the second lower limit processing block 286.

Further, a demand right rear wheel torque calculation block 289 calculates demand right rear wheel torque 291 that is a sum value of the value selected by the above-described first lower limit processing block 285 and the value calculated by the second deficiency calculation block 288. Further, a demand left rear wheel torque calculation block 290 calculates demand left rear wheel torque 292 that is a sum value of the value selected by the second lower limit processing block 286 and the value calculated by the second deficiency calculation block 288. The demand right rear wheel torque 291 and the demand left rear wheel torque 292 are to be command values (command torque) of the driving torque (hereinafter simply referred to as "torque") distributed to the left and right rear wheels WRL, WRR in the torque distribution control of the present embodiment.

Figure 9A:
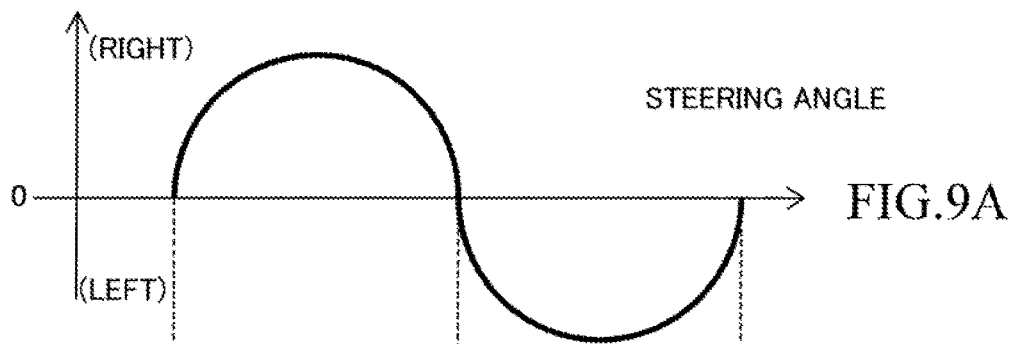
FIGS. 9A to 9C are diagrams showing changes in command values of torque distributed to left and right rear wheels in a case where demand left-right sum torque is equal to or larger than a predetermined lower limit value in a torque distribution control according to a second embodiment.
Figure 9B:
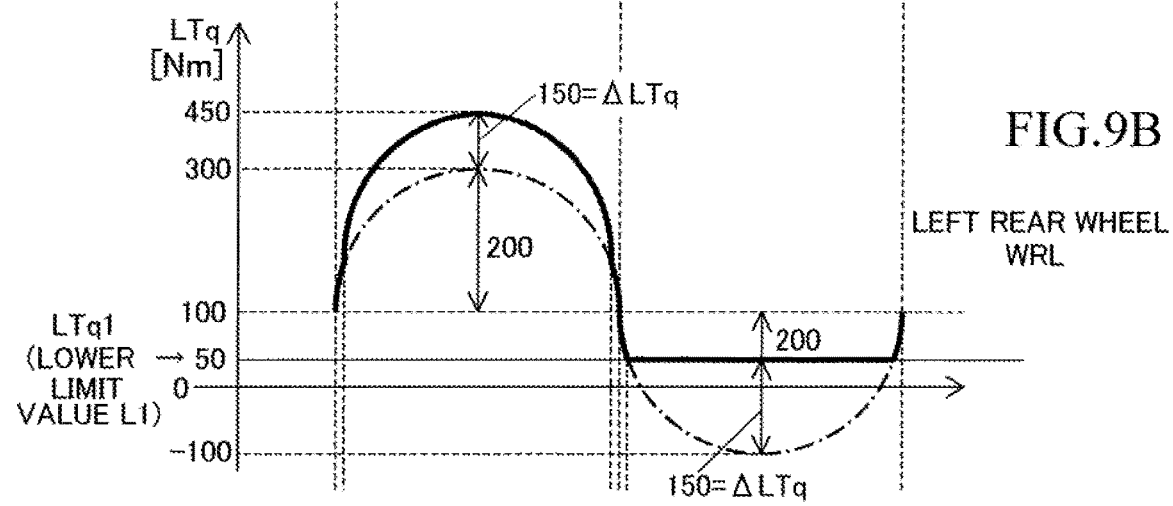
Figure 9C:
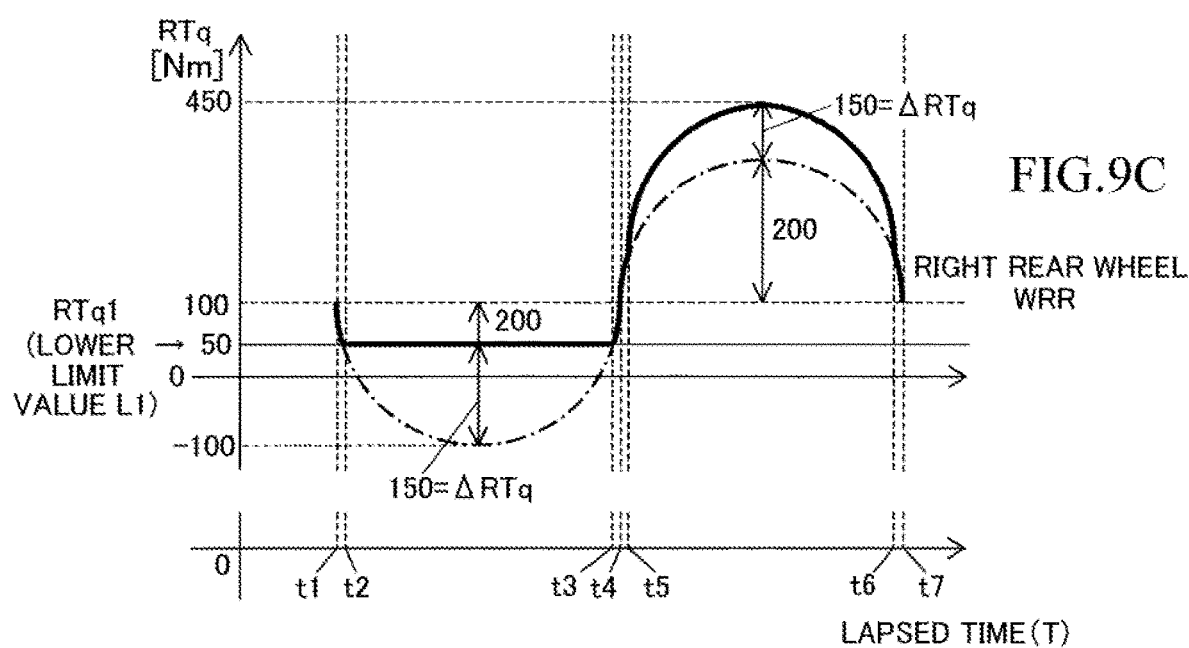
Figure 10A:
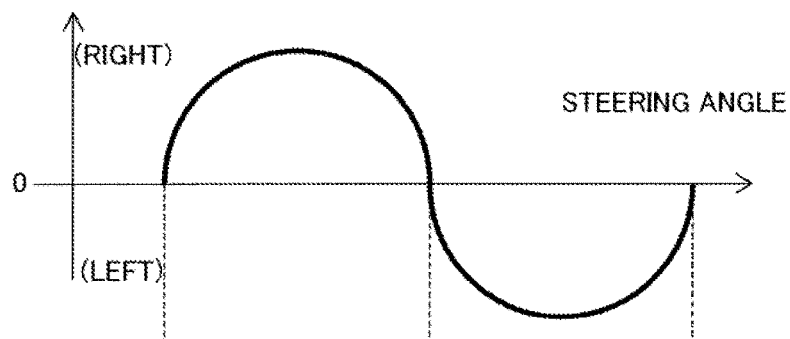
FIGS. 10A to 10C are views showing changes in command values of torque distributed to left and right rear wheels in a case where demand left-right sum torque is less than a predetermined lower limit value in a torque distribution control according to a second embodiment.
Figure 10B:
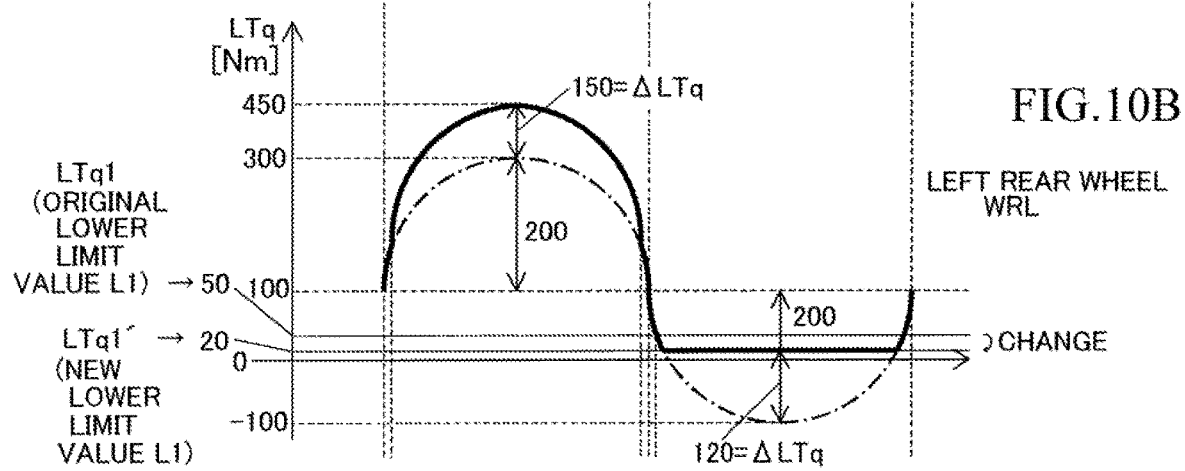
Figure 10C:
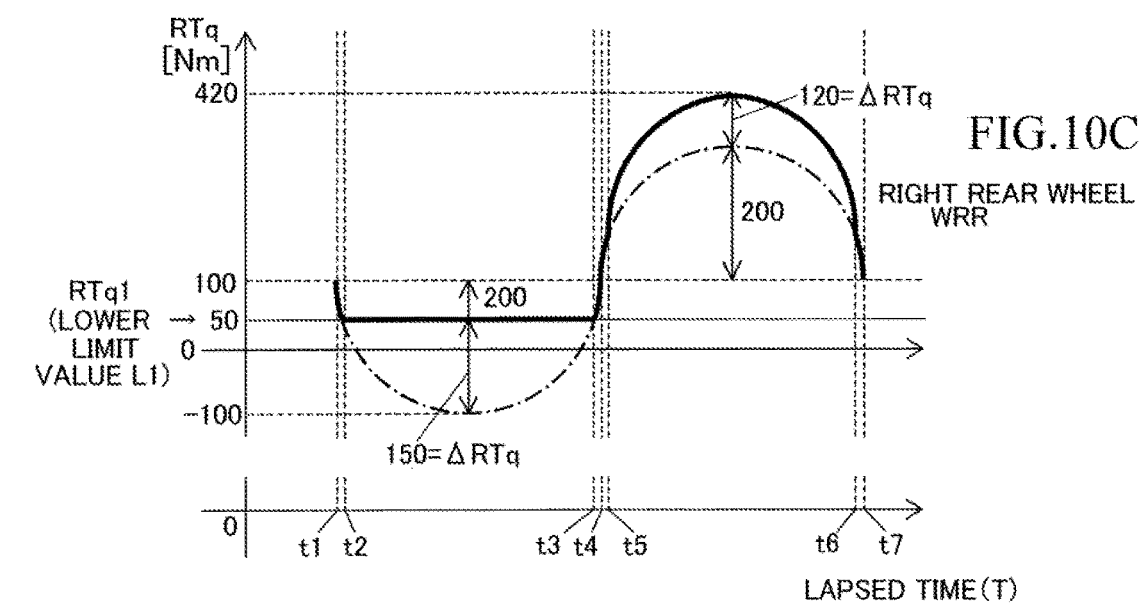

FIGS. 9 and 10 are views showing changes (with respect to elapsed time t) in the command values of the torque distributed to the left and right rear wheels WRL, WRR in the torque distribution control of the second embodiment. FIGS. 9 and 10A show steering angles (steering angles of the steering wheel) of the vehicle, FIG. 10B shows the command value LTq [Nm] distributed to the left rear wheel WRL, and FIG. 10C shows the command value RTq [Nm] distributed to the right rear wheel WRR. And, FIG. 9 shows a case in which the demand left-right sum torque TM (=LTq+RTq) is equal to or larger than the lower limit value L1 (=LTq1, RTq1) of the preset demand torque in the left and right rear wheels WRL, WRR (demand left-right torque sum torque≥lower limit value L1), and no change (switch) is applied to the lower limit value L1 (=LTq1, RTq1) of the torque distributed to the left and right rear wheels WRL, WRR. On the other hand, FIG. 10 shows a case in which the demand left-right sum torque TM is below the above-mentioned lower limit L1 (=LTq1, RTq1) (demand left-right torque sum torque<lower limit value L1), and change (switch) is applied to the lower limit value L1 (=LTq1, RTq1) of the torque distributed to the left and right rear wheels WRL, WRR.

First, if the demand left-right sum torque TM shown in FIG. 9 is equal to or larger than the predetermined lower limit value L1, as shown in FIG. 9, the vehicle starts to turn right at the time t1, so that the command torque LTq of the left rear wheel WRL gradually increases from LTq=100 [Nm]. On the other hand, the command torque RTq of the right rear wheel WRR gradually decreases from RTq=100 [Nm]. Then, the command torque RTq of the right rear wheel WRR becomes the lower limit value RTq1=50 [Nm] at the time t2 and is thus maintained thereafter at a constant torque RTq=lower limit RTq1=50 [Nm] until the time t3. Namely, the basic value (indicated by the alternate long and short dash line) of the command torque of the rear right wheel WRR is below the lower limit value RTq1=50 [Nm] from the time t2 to the time t3. Therefore, during that time, the lower limit value RTq1=50 [Nm] is selected as the command torque RTq of the right rear wheel WRR without selecting the basic value (indicated by the alternate long and short dash line). On the other hand, the command torque LTq of the left rear wheel WRL is a value obtained by adding the predetermined addition value ΔLTq (≤150 [Nm]) to the basic value of the command torque LTq from the time t2 to the time t3. The addition value ΔLTq added here corresponds to the difference ΔRTq between the basic value and the lower limit torque RTq1 of the command torque RTq in the right rear wheel WRR.

Also, the vehicle switches from right turn to left turn at the time t4, so that thereafter the command torque LTq of the left rear wheel WRL decreases from LTq=100 [Nm]. On the other hand, the command torque RTq of the right rear wheel WRR increases from RTq=100 [Nm]. Then, the command torque LTq of the left rear wheel WRL becomes the lower limit value LTq1=50 [Nm] at the time t5, and is thus maintained thereafter at a constant value of the lower limit value LTq1=50 [Nm] until the time t6. Namely, the basic value (indicated by the alternate long and short dash line) of the command torque LTq of the left rear wheel WRL is below the lower limit value LTq1=50 [Nm] from the time t5 to the time t6. Therefore, during that time, the lower limit value LTq1=50 [Nm] is selected as the command torque LTq of the left rear wheel WRL without selecting the basic value (indicated by the alternate long and short dash line). On the other hand, the command torque RTq of the right rear wheel WRR is a value obtained by adding the predetermined addition value ΔRTq (≤150 Nm) to the basic command value RTq from the time t5 to the time t6. This addition value ΔRTq corresponds to the difference ΔLTq between the basic value and the lower limit torque LTq1 of the command torque LTq in the left rear wheel WRL.

Next, when the demand left-right sum torque TM shown in FIG. 10 is below the lower limit value L1, as shown in the same figure, the vehicle starts to turn right at the time t1, whereby the command torque LTq of the left rear wheel WRL gradually increases from LTq=100 [Nm]. On the other hand, the command torque RTq of the right rear wheel WRR gradually decreases from RTq=100 [Nm]. Then, the command torque RTq of the right rear wheel WRR becomes the lower limit value RTq1=50 [Nm] at the time t2, and is thus maintained thereafter at a constant torque RTq=the lower limit RTq1=50 [Nm] until the time t3. Namely, the basic value (indicated by the alternate long and short dash line) of the command torque of the right rear wheel WRR is below the lower limit value RTq1=50 [Nm] from the time t2 to the time t3. Therefore, during that time, the lower limit value RTq1=50 [Nm] is selected as the command torque RTq of the right rear wheel WRR without selecting the basic value (indicated by the alternate long and short dash line). On the other hand, the command torque LTq of the left rear wheel WRL is a value obtained by adding the predetermined addition value ΔLTq (≤150 [Nm]) to the basic value of the command torque LTq from the time t2 to the time t3. The addition value ΔLTq added here corresponds to the difference ΔRTq between the basic value and the lower limit torque RTq1 of the command torque RTq in the right rear wheel WRR.

In the case shown in FIG. 10, as the demand left-right sum torque TM is equal to or larger than the lower limit value (lower limit torque) LTq1=50 [Nm] until the time t4, the lower limit value (lower limit torque) LTq1 is 50 [Nm] (LTq1=50 [Nm]), and as the demand left-right sum torque TM becomes less than the lower limit value (lower limit torque) LTq1 after the time t4, the lower limit value LTq1' becomes 20 [Nm] (LTq1'=20 [Nm]). Namely, the lower limit value LTq1' after this time t4 is the value of the demand left-right sum torque TM after the time t4. In other words, the demand left-right sum torque TM falls below the original lower limit value LTq1=50 [Nm] after the time t4, so that the original lower limit value LTq1 is changed to the demand left-right sum torque TM value (new lower limit value LTq1').

The vehicle switches from the right turn to the left turn at the time t4, so that thereafter the command torque LTq of the left rear wheel WRL decreases. On the other hand, the command torque RTq of the right rear wheel WRR increases. Then, the command torque LTq of the left rear wheel WRL becomes a new lower limit value LTq1'=20 [Nm] at the time t5, and is thus maintained thereafter at a constant value of the lower limit value LTq1'=20 [Nm] until the time t6. Namely, the basic value (indicated by the alternate long and short dash line) of the command torque LTq of the left rear wheel WRL is below the lower limit value LTq1'=20 [Nm] from the time t5 to the time t6. Therefore, during this time, LTq1'=20 [Nm] is selected as the command torque LTq of the left rear wheel WRL without selecting the basic value (indicated by the alternate long and short dash line). On the other hand, the command torque RTq of the right rear wheel WRR is a value obtained by adding a predetermined addition value ΔRTq' (≤120 Nm) to the basic command value RTq from the time t5 to the time t6. This addition value ΔRTq' corresponds to a difference ΔLTq' between the basic value and the lower limit torque LTq1' of the command torque LTq in the left rear wheel WRL.

In this manner, by adding a shortfall of torque below the lower limit torque LTq1 (LTq1') or RTq1 in the left rear wheel WRL or the right rear wheel WRR to the command torque LTq or RTq of the left rear wheel WRL or the right rear wheel WRR on the opposite side, while the command torque of the left rear wheel WRL or the right rear wheel WRR can be prevented from falling below the preset lower limit torque LTq1 (LTq1') or RTq1, the difference between the command torque of the left rear wheel WRL and the command torque of the right rear wheel WRR can be always maintained constant or above a certain level.

Namely, in the torque distribution control of the left and right rear wheels WRL, WRR of the present embodiment, when torque vectoring of the left and right rear wheels (auxiliary drive wheels) WRL, WRR is performed using the system having the two-clutch type rear differential gear 16, the lower limit (lower limit value LTq1, RTq1) is provided to the command value of the driving torque so that no driving force of one of the left and right wheels becomes zero or close to zero due to the left-right difference demand of the driving force. Further, by performing the control to add the shortfall of command torque below the predetermined lower limit value LTq1, RTq1 to the command torque of the rear wheel on the opposite side, the difference in the command torque between the left and right rear wheels WRL, WRR is maintained.

In addition, when controlling the command value LTq, RTq of the driving torque to be the predetermined lower limit value L1 (LTq1, RTq1) as described above, if the left-right sum torque command value TM, which is the sum of the command values of the torque distributed to the left rear wheel WRL and the right rear wheel WRR, falls below the predetermined lower limit value L1, this predetermined lower limit value L1 is changed to the left-right sum torque command value TM (the lower limit value L1 is made the left-right sum torque command value TM).

If the lower limit value L1 is adopted as it is even when the left-right sum torque command value TM falls below the lower limit value L1, the driving torque is transmitted to the left and right rear wheels WRL, WRR even in the running state of the vehicle in which the command value of the driving torque distributed to the left and right rear wheels WRL, WRR is very small or substantially zero (for example, when an accelerator is off), thereby affecting the fuel consumption (fuel consumption rate) of the vehicle and the durability of the device. However, according to the control of the present embodiment, when the left-right sum torque command value TM falls below the predetermined lower limit value L1, the driving torque can be prevented from being transmitted to the left and right rear wheels WRL, WRR in the running condition, as described above, by changing this predetermined lower limit value L1 to the left-right sum torque command value TM. This can improve the fuel consumption (fuel consumption rate) of the vehicle and the durability of the device.

Further, in this torque distribution control device for the four-wheel drive vehicle, the difference ΔTq between the command value LTq of the driving torque distributed to the left rear wheel WRL using the left clutch 40L and the command value RTq of the driving torque distributed to the right rear wheel WRR using the right clutch 40R is controlled to be a constant value.

According to this configuration, by controlling the difference ΔTq between the command values of the driving torque to be the constant value, an appropriate difference can be provided in the driving torque according to the demand values of the driving forces for the left and right rear wheels WRL, WRR. This enables a more appropriate driving force distribution control.

In addition, in this torque distribution control device for the four-wheel drive vehicle, if the command value LTq, RTq of the driving torque distributed to one of the left and right rear wheels WRL, WRR using one of the left clutch 40L and right clutch 40R falls below the predetermined lower limit value LTq1, RTq1, the control is performed so that the difference ΔLTq, ΔRTq between the command value LTq, RTq of the driving torque and the predetermined lower limit value LTq1, RTq1 is added to the command value LTq, RTq of the driving torque distributed to the other of the left and right rear wheels WRL, WRR using the other of the left and right clutch 40L, 40R.

According to this configuration, by adding the difference ΔLTq, ΔRTq between the command value LTq, RTq of the driving torque of one of the left and right clutches 40L, 40R and the lower limit value LTq1, RTq1 to the command value LTq, RTq of the driving torque of the other clutch 40L, 40R, while the command value LTq, RTq of the driving torque of the one clutch 40L, 40R is prevented from falling below the lower limit value LTq1, RTq1, the difference between the value LTq, RTq of the driving torque of the one clutch 40L, 40R and the command value LTq1, RTq1 of the driving torque of the other clutch 40L, 40R can be secured. Therefore, while the command value LTq, RTq of the driving torque is prevented from reaching small value exceeding the limit, the appropriate difference between the demand values LTq, RT of the driving torque can be provided according to the command values of the driving forces for the left and right rear wheels WRL, WRR, so that the appropriate driving force distribution control can be performed.

The particular configuration of the driving force transmission system shown in FIG. 1 is one example. As far as a general configuration of the driving force transmission system for performing the driving force distribution control according to the present embodiment includes in the four-wheel drive vehicle in which ones and the others of the front wheels and the rear wheels that are respectively the main drive wheels and the auxiliary drive wheels, the front-rear torque distribution device for distributing the driving torque transmitted to the ones and the others of the main drive wheels and the auxiliary drive wheels and the left-right torque distribution device for distributing the driving torque transmitted to one and the other of the left auxiliary wheel and the right auxiliary drive wheel, a specific configuration thereof may be different from that shown in FIG. 1.

Third Embodiment

Figure 11:
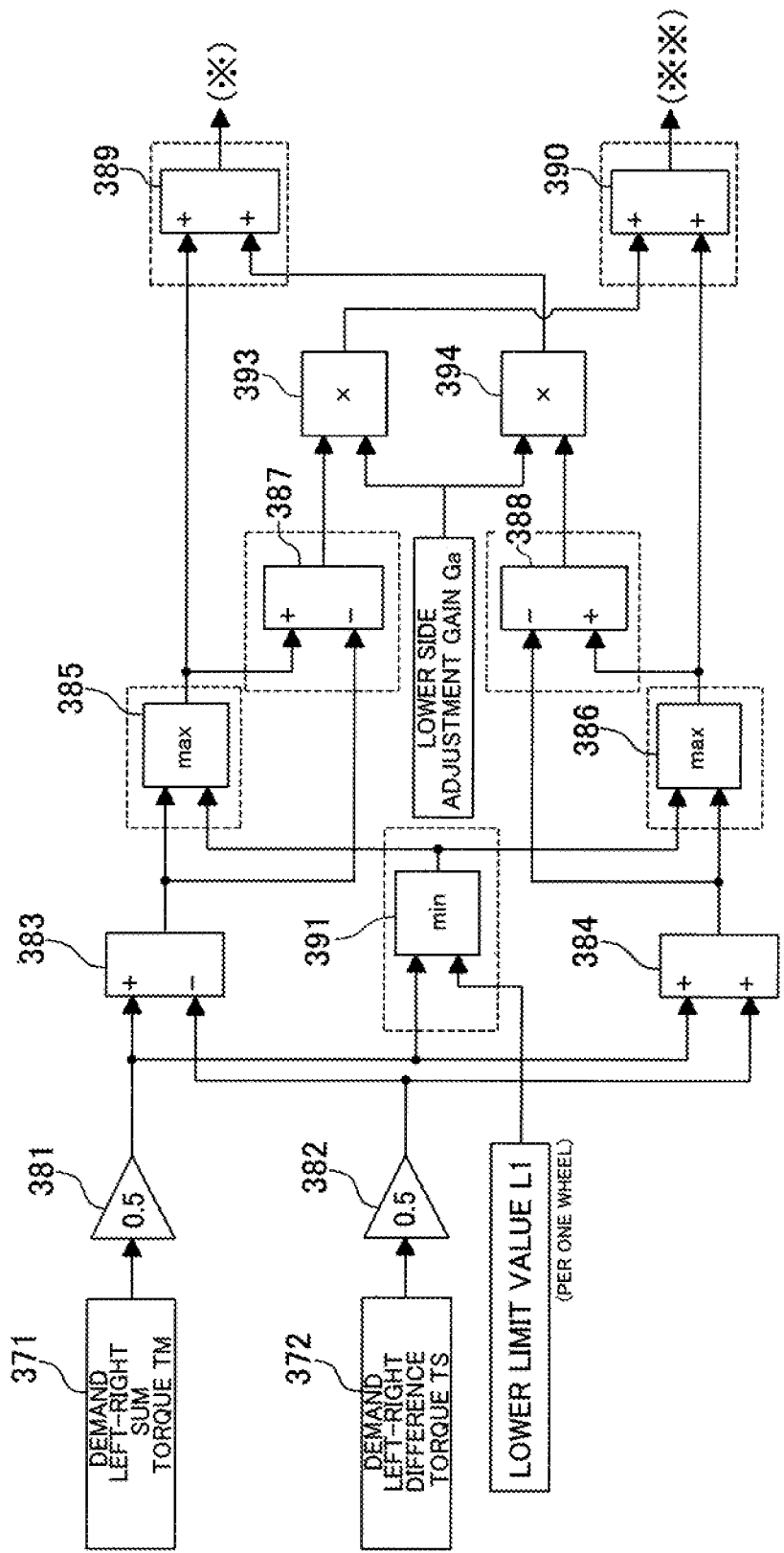
FIG. 11 is a block diagram showing a flow of processing in a torque distribution control according to a third embodiment.
Figure 12:
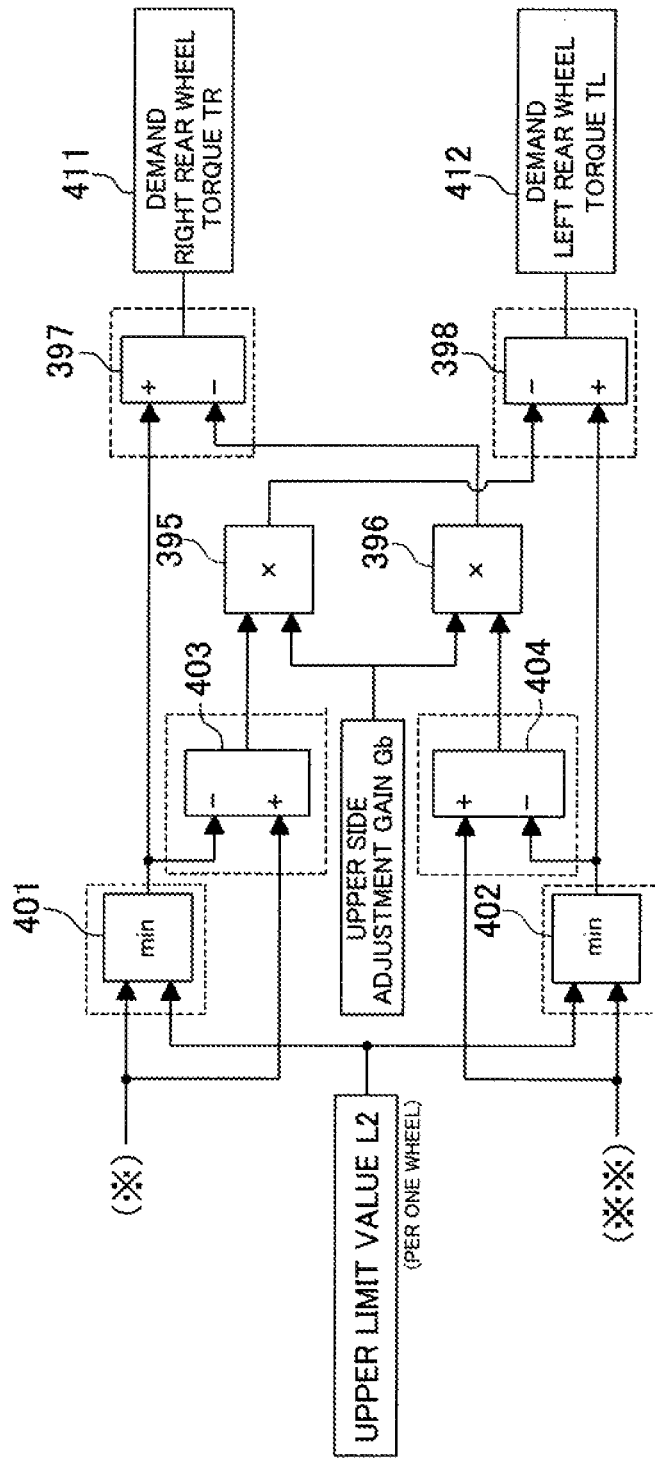
FIG. 12 is a block diagram showing a flow of processing in a torque distribution control according to a third embodiment.

FIGS. 11 and 12 are block diagrams for describing the flow of processing in a torque distribution control of the third embodiment. In this torque distribution control, demand left-right sum torque (rear wheel shaft torque) TM (371) and demand left-right difference torque TS (372) are input and limited respectively in limit blocks 381, 382. Here, both become values of 0.5 (½) time of each torque. Thereafter, a difference calculation block 383 calculates a difference value between the demand left-right sum torque TM and the demand left-right difference torque TS, and a sum calculation block 384 calculates a sum value of the demand left-right sum torque TM and the demand left-right difference torque TS.

Further, a lower limit value calculation block 391 compares the demand left-right sum torque TM limited in the limit block 381 to a lower limit value (lower limit value per one wheel) L1 of a preset demand torque in the left and right rear wheels WRL, WRR, whereby a lower value thereof is output. Namely, when the lower limit value L1 is smaller than the output value from the limit block 381, the lower limit value L1 is output as the output value from the lower limit value calculation block 391, and when the output value from the limit block 381 is smaller than the lower limit value L1, the output value from the limit block 381 is output as the output value from the lower limit value calculation block 391.

Thereafter, a first lower limit processing block 385 compares the above-described difference value calculated by the difference calculation block 383 to the output value from the lower limit value calculation block 391, and then performs a processing (lower limit processing) for selecting a larger one. Namely, when the difference value between the demand left-right sum torque TM and the demand left-right difference torque TS is larger than the output value from the lower limit value calculation block 391, this difference value is selected. And, when the difference value between the demand left-right sum torque TM and the demand left-right difference torque TS is equal to or less than the output value from the lower limit value calculation block 391, this output value is selected. Thereafter, a first deficiency calculation block 387 calculates a difference value between the difference value between the demand left-right sum torque TM and the demand left-right difference torque TS calculated by the difference calculation block 383 and the value selected by the first lower limit processing block 385.

On the other hand, a second lower limit processing block 386 compares the above-described sum value calculated by the sum calculation block 384 and the output value from the lower limit value calculation block 391, and then performs a processing (lower limit processing) for selecting a larger one. Namely, when the sum value of the demand left-right sum torque TM and the demand left-right difference torque TS is larger than the output value from the lower limit value calculation block 391, this sum value is selected. And, when the sum value of the demand left-right sum torque TM and the demand left-right difference torque TS is equal to or less than the output value from the lower limit value calculation block 391, this output value is selected. Thereafter, a second deficiency calculation block 388 calculates a difference between the sum value of the demand left-right sum torque TM and the demand left-right difference torque TS calculated by the sum calculation block 384 and the value selected by the second lower limit processing block 386.

Further, a first adjustment gain multiplication section 393 calculates a value obtained by multiplying the value calculated in the first deficiency calculation block 387 by a value of lower limit side deficiency adjustment gain Ga (hereinafter referred to as "lower limit adjustment gain"). And, a second adjustment gain multiplication section 394 calculates a value obtained by multiplying the value calculated in the second deficiency calculation block 388 by the value of lower limit side adjustment gain Ga.

Further, a demand right rear wheel torque calculation block 389 calculates a sum value of the value selected by the above-described first lower limit processing block 385 and the value calculated by the second adjustment gain multiplication section 394. Also, a demand left rear wheel torque calculation block 390 calculates a sum value of the value selected by the above-described second lower limit processing block 386 and the value calculated by the first adjustment gain multiplication section 393. It should be noted that the marks (*) and (**) shown at the right end of FIG. 11 are continued respectively to the marks (*) and (**) shown at the left end of FIG. 12.

Thereafter, as shown in FIG. 12, a first upper limit processing block 401 compares the above-described sum value calculated by the demand right rear wheel torque calculation block 389 to an upper limit value L2 (upper limit value per one wheel) of the preset demand torque in the left and right rear wheels WRL, WRR, and then performs a processing (upper limit processing) for selecting a smaller value. Namely, if the sum value calculated by the demand right rear wheel torque calculation block 389 (the sum value of the value selected by the first lower limit processing block 385 and the value calculated by the second adjustment gain multiplication section 394) is larger than the upper limit value L2, this upper limit value L2 is selected. And, if the sum value calculated by the demand right rear wheel torque calculation block 389 is equal to or less than the upper limit value L2, the sum calculated by the demand right rear wheel torque calculation block 389 is selected. Thereafter, a third deficiency calculation block 387 calculates a difference value between the above-described sum value calculated by the demand right wheel torque calculation block 389 and the value selected by the first lower limit processing block 401.

On the other hand, a second upper limit processing block 402 compares the above-described sum value calculated by the demand left rear wheel torque calculation block 390 to the upper limit value L2 (upper limit value per one wheel) of the preset demand torque in the left and right rear wheels WRL, WRR, and then performs a processing (upper limit processing) for selecting the smaller value. Namely, if the sum value calculated by the demand left rear wheel torque calculation block 390 (the sum value of the value selected by the second lower limit processing block 386 and the value calculated by the first adjustment gain multiplication section 393) is larger than the upper limit value L2, this upper limit value L2 is selected. And, if the sum value calculated by the demand left rear wheel torque calculation block 390 is equal to or less than the upper limit value L2, the sum value calculated by the demand left rear wheel torque calculation block 390 is selected. Thereafter, a fourth deficiency calculation block 404 calculates a difference value between the above-described sum value calculated by the demand left rear wheel torque calculation block 389 and the value selected by the second upper limit processing block 402.

Further, a third adjustment gain multiplication section 395 calculates a value obtained by multiplying the value calculated in the third deficiency calculation block 403 by a value of upper side deficiency adjustment gain Ga (hereinafter referred to as "upper limit side adjustment gain"). And, a fourth adjustment gain multiplication section 396 calculates a value obtained by multiplying the value calculated in the fourth deficiency calculation block 404 by the value of the upper limit side adjustment gain Ga.

Further, a demand right rear wheel torque calculation block 397 calculates demand right rear wheel torque 411 that is a sum value of the above-described value selected by the first upper limit processing block 401 and the above-described value calculated by the fourth adjustment gain multiplication section 396. Further, a demand left rear wheel torque calculation block 398 calculates demand left rear wheel torque 412 that is a sum value of the above-described value selected by the second upper limit processing block 402 and the above-described value calculated by the third adjustment gain multiplication section 395. The demand right rear wheel torque 411 and the demand left rear wheel torque 412 are to be the command values (command torque) of the driving torque distributed to the left and right rear wheels WRL, WRR in the torque distribution control of the present embodiment.

Figure 13A:
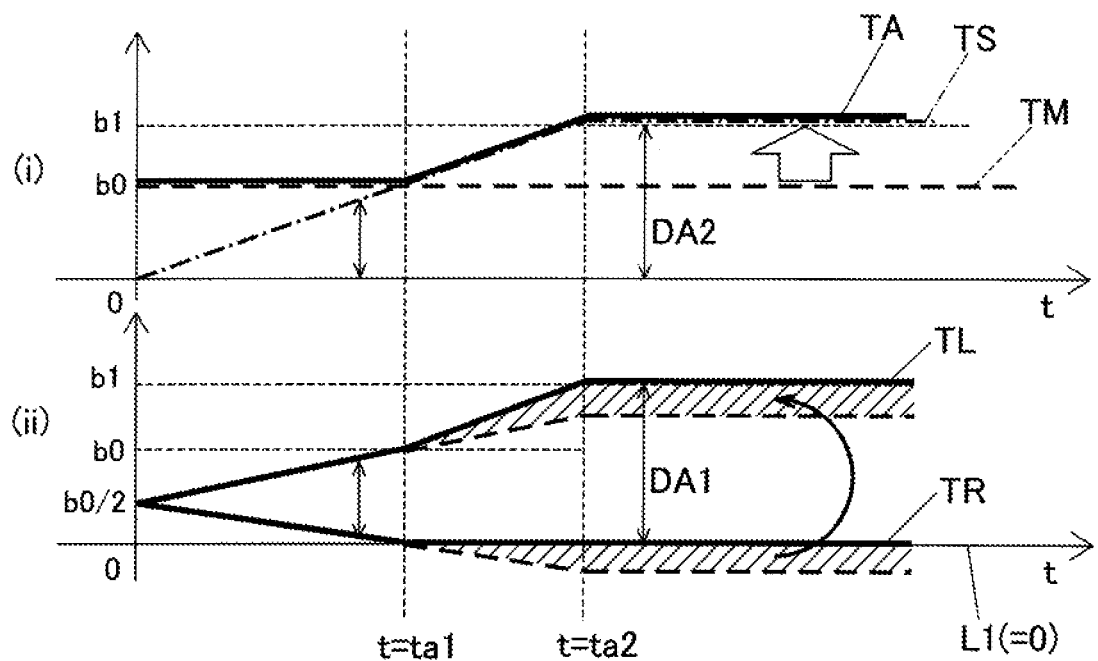
FIGS. 13A and 13B are views showing changes in command values of torque distributed to left and right rear wheels in a torque distribution control according to a third embodiment.
Figure 13B:
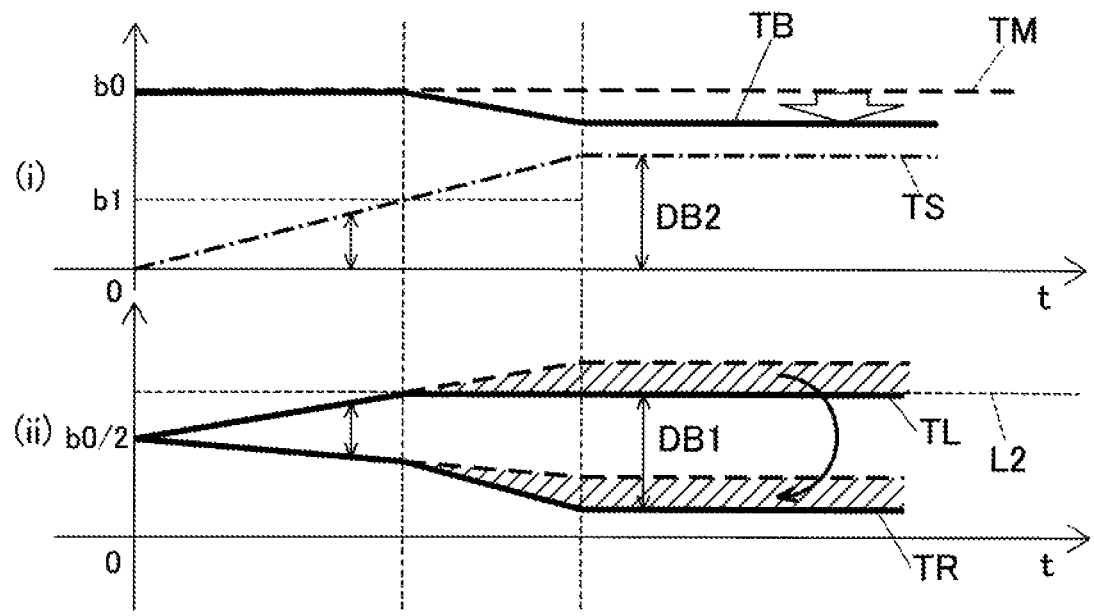

FIGS. 13A and 13B are views (graphs) showing one example of changes (with respect to elapsed time t) in the command values (command torque) of the torque distributed to the left and right rear wheels WRL, WRR in the torque distribution control of the third embodiment. The same figures show a left-right difference priority control that preferentially makes the difference in the driving torque (left-right distribution driving torque) distributed to the left rear wheel WRL and the right rear wheel WRR follow the command value thereof. As shown in FIG. 13A, this control is to prioritize the difference (left-right difference) in the driving torque distributed to the left rear wheel WRL and the right rear wheel WRR and thus increases the total value of the driving torque distributed to the left and right rear wheels WRL, WRR (demand left-right sum torque TM). And, as shown in FIG. 13B, this control is to prioritize the difference (left-right difference) in the driving torque distributed to the left rear wheel WRL and the right rear wheel WRR and thus reduce the total value of the driving torque distributed to the left and right rear wheels WRL, WRR (demand left-right sum torque TM). In addition, the sections marked by (i) in FIGS. 13A and 13B are graphs showing changes in the demand left-right sum torque TM and the demand left-right difference torque TS, which are respectively the sum and difference values of the command torque distributed to each of the left rear wheel WRL and the right rear wheel WRR. The sections marked by (ii) in FIGS. 13A and B are graphs showing changes in the demand right rear wheel torque TR and the demand left rear wheel torque TL as the command torque distributed to each of the left rear wheel WRL and the right rear wheel WRR.

In the example shown in FIG. 13A, the lower limit side adjustment gain is +1 (Ga=+1), as described above. And, the difference between the driving torque TL distributed to the left wheel WRL and the driving torque TR distributed to the right rear wheel WRR generated at time t=0 gradually changes (increases). Until time t=ta1, the demand left-right sum torque TM is a constant value (b0) and distributed so that the total value (sum) of the driving torque TL distributed to the left rear wheel WRL and the driving torque TR distributed to the right rear wheel WRR is constant. After time t=ta1, the command value TR of the driving torque distributed to the rear right wheel WRR (command value before correction) falls below the lower limit value (lower limit value per wheel) L1 (=0). Thus, a control is performed to add a shortfall below the lower limit value L1 (indicated by the shaded area in the figure) to the driving torque TL distributed to the left rear wheel WRL on the opposite side. As a result, as shown in the sections marked by (i) and (ii) in FIG. 13A, while the total driving torque (left-right sum torque) TA actually distributed to the left and right rear wheels WRL, WRR increases more than the demand left-right sum torque TM, it is possible to make a value DA2 of the demand left-right difference torque TS equal to a value DA1 of the actual left-right difference torque (DA1=DA2).

Namely, in this example, if the demand left-right difference torque TS is larger than the demand left-right sum torque TM, and thus the command value TR of the driving torque distributed to the right rear wheel WRL falls below the lower limit value L1, the left-right difference is maintained by adding the shortfall below the lower limit value L1 to the driving torque TL distributed to the left rear wheel WRL (by adding a value obtained by multiplying the shortfall below the lower limit value L1 by the lower limit side adjustment gain Ga (=+1) to the driving torque TL).

Further, in the example shown in FIG. 13B, the upper limit side adjustment gain Gb is +1 (Gb=+1). In this case also, the difference generated at the time t=0 between the driving torque TL distributed to the left rear wheel WRL and the driving torque TR distributed to the right rear wheel WRR gradually changes (increases). Until time t=tb1, the demand left-right sum torque TM is the constant value (b0) and distributed so that the total value (sum) of the driving torque TL distributed to the left rear wheel WRL and the driving torque TR distributed to the right rear wheel WRR is constant. After the time t=tb1, the command value TL (command value before correction) of the driving torque distributed to the left rear wheel WRL exceeds the upper limit value (per one wheel) L2, thereby performing a control to subtract this upper limit value L2 (indicated by the shaded area in the figure) from the driving torque TR distributed to the right rear wheel WRR. As a result, as shown in the sections marked by (i) and (ii) in FIG. 13, the total driving torque (left-right sum torque) TB actually distributed to the left and right rear wheels WRL, WRR decreases below the demand left-right sum torque TM, it is possible to make a value DB2 of the demand left-right difference torque TS equal to a value DB1 of the actual left-right difference torque (DB1=DB2).

Namely, in this example, if the driving torque TL distributed to the left rear wheel WRL is larger than the upper limit value L2 (per one wheel), the left-right difference is maintained by substracting an excess of the upper limit value L2 from the driving torque TL distributed to the right rear wheel WRR (by subtracting a value obtained by multiplying the excess of the upper limit value L2 by the upper limit side adjustment gain Gb (=+1) from the driving torque TL).

Figure 14A:
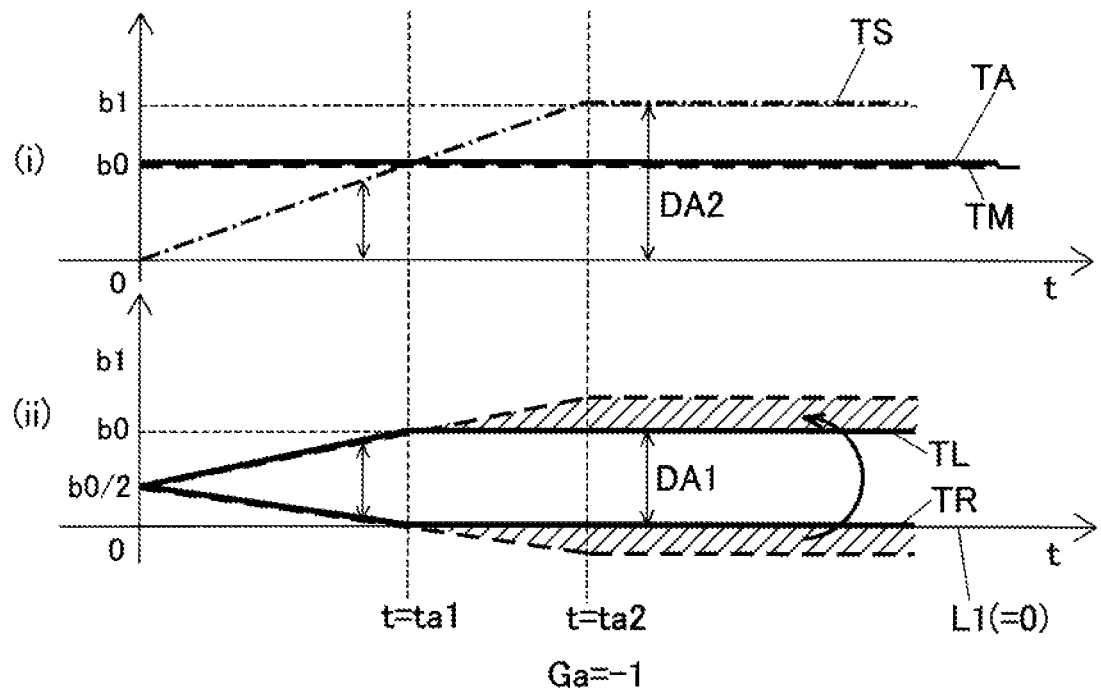
FIGS. 14A and 14B are views showing changes in command values of torque distributed to left and right rear wheels in a torque distribution control according to a third embodiment.
Figure 14B:
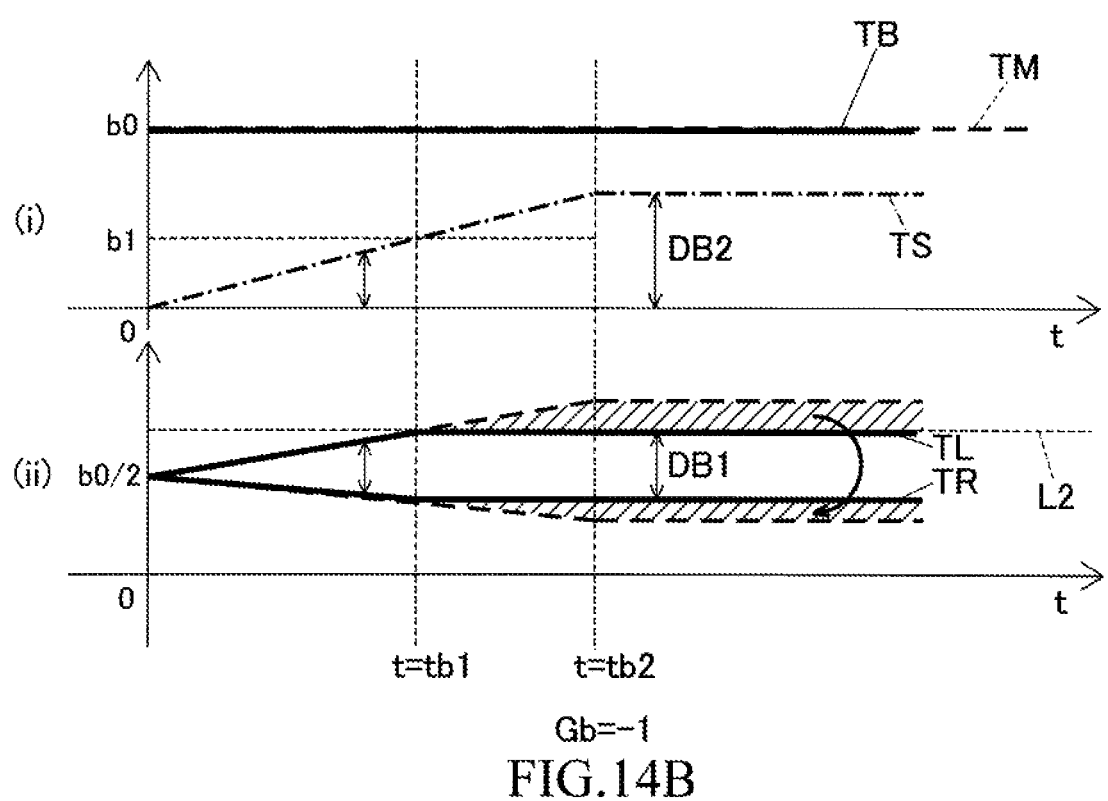

FIG. 14 is a graph showing another example of changes (with respect to elapsed time t) in the command values (command torque) of the torque distributed to the left and right rear wheels WRL, WRR in the torque distribution control of the third embodiment. The figure shows a left-right sum priority control that preferentially makes the total driving torque (front-rear distribution driving torque) distributed to the left and right rear wheels WRL, WRR follow the command value thereof. And, as shown in FIGS. 14A and 14B, this control is to maintain the total value of the driving torque distributed to the left rear wheel WRL and the right rear wheel WRR (demand left-right sum torque TM) without prioritizing the difference (left-right difference) in the driving torque distributed to the left and right rear wheels WRL, WRR. Also, the sections marked by (i) in FIGS. 14A and 14B are graphs showing changes in the demand left-right sum torque TM and the demand left-right difference torque TS, which are respectively the sum and difference values of the command torque distributed to each of the left rear wheel WRL and the right rear wheels WRR, and the sections marked by (ii) therein are graphs showing changes in the demand right rear wheel torque TR and the demand left rear wheel torque TL as the command torque distributed to each of the left rear wheel WRL and the right rear wheel WRR.

In the example shown in FIG. 14A, the lower limit side adjustment gain Ga is −1 (Ga=−1). In this case also, the difference between the driving torque TL distributed to the left rear wheel WRL and the driving torque TR distributed to the right rear wheel WRR generated at the time t=0 gradually changes (increases). As shown in the section (i) in FIG. 14A, until time t=ta1, the demand left-right sum torque TM is the constant value (b0) and distributed so that the total value (sum) of the driving torque TL distributed to the left rear wheel WRL and the driving torque TR distributed to the right rear wheel WRR is constant. After time t=ta1, the command value (command value before correction) of the driving torque TR distributed to the right rear wheel WRR falls below the lower limit value (per one wheel) L1, thereby performing a control to subtract a shortfall below this lower limit value L1 (indicated by the shaded area in the figure) from the driving torque TL distributed to the rear left wheel WRL on the opposite side. As a result, as shown in the sections marked by (i) and (ii) in FIG. 14, the total driving torque (left-right sum torque) TA of the driving torque TL distributed to the left rear wheel WRL and the driving torque TR distributed to the right rear wheel WRR can be maintained at the constant value (=b0). On the other hand, the difference value (value of the actual left-right difference torque) DA1 between the driving torque TL distributed to the left wheel WRL and the driving torque TR distributed to the right rear wheel WRR falls below the target value (value of the demand left-right difference torque TS) DA2 (DA1<DA2). It should be noted that after time t=ta2, the demand left-right difference torque TS becomes a constant value, and thus the total value and the left-right difference are maintained constant.

Namely, in this example, if the demand left-right difference torque TS is larger than the demand left-right sum torque TM, and thus the command value TR of the driving torque distributed to the right rear wheel WRL falls below the lower limit value L1, the total value is maintained by adding a shortfall below the lower limit value L1 to the driving torque TL distributed to the left rear wheel WRL (by subtracting a value obtained by multiplying the shortfall below the lower limit value L1 by the lower limit side adjustment gain Ga (=+1) from the driving torque TL).

Also, in the example shown in FIG. 14B, the upper limit side adjustment gain Gb is −1 (Gb=−1). In this case also, the difference generated at the time t=0 between the driving torque TL distributed to the left rear wheel WRL and the driving torque TR distributed to the right rear wheel WRR gradually changes (increases). Until time t=tb1, the demand left-right sum torque TM is the constant value (b0) and distributed so that the total value (sum) of the driving torque TL distributed to the left rear wheel WRL and the driving torque TR distributed to the right rear wheel WRR is constant. And after the time t=tb1, the command value (command value before correction) of the driving torque TL distributed to the left rear wheel WRL exceeds the upper limit value (per one wheel) L2, thereby performing a control so that an excess of this upper limit value L2 is added to the driving torque TR distributed to the right rear wheel WRR. As a result, as shown in the section marked by (i) in FIG. 14B, the total (left-right sum torque) TB of the driving torque distributed to the left rear wheel WRL and the right rear wheel WRR can be maintained at the constant value (=b0). On the other hand, the difference value DB1 between the driving torque TL distributed to the left rear wheel WRL and the driving torque distributed to the right rear wheel WRR, as shown in the section marked by (ii) in FIG. 14B, becomes smaller than the target value (the value of demand left-right difference torque TS) DB2 as shown in the section marked by (i) in FIG. 14B (DB1<DB2).

Namely, in this example, if the driving torque TL distributed to the left rear wheel WRL is larger than the upper limit value L2 (per one wheel), the total value is maintained by substracting an excess of the upper limit value L2 from the driving torque TL distributed to the right rear wheel WRR (by adding a value obtained by multiplying the excess of the upper limit value L2 by the upper limit side adjustment gain Gb (=+1) to the driving torque TL).

Figure 15:
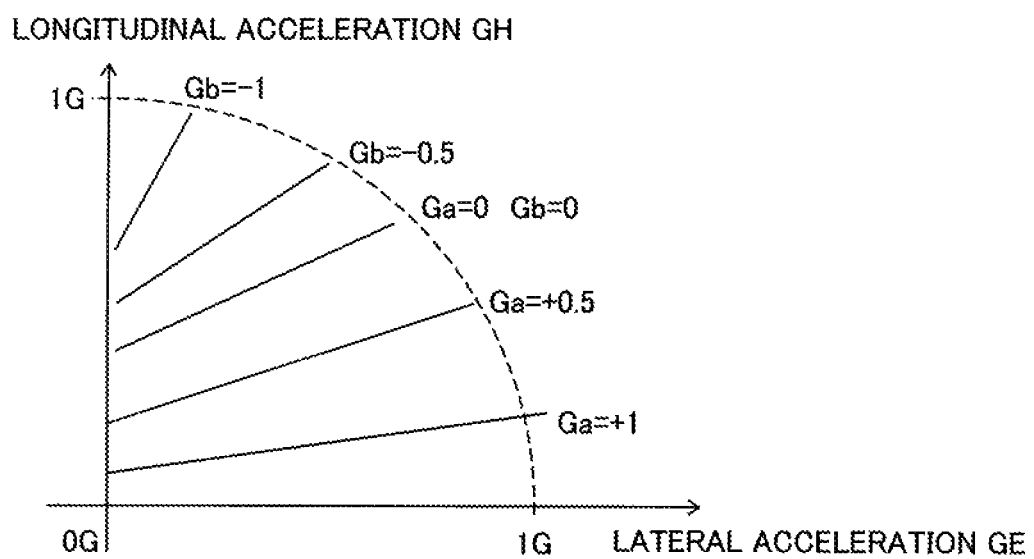
FIG. 15 is a view for describing set values of adjustment gain.

FIG. 15 is a view for describing set values of the lower limit side adjustment gain Ga and the upper limit side adjustment gain Gb. As described above, in the example of FIG. 13A, the value of the lower limit side adjustment gain Ga is set at +1 (Ga=+1), and in the example of FIG. 13B, the value of the upper limit side adjustment gain Gb is set at +1 (Gb=+1). In the example of FIG. 14A, the value of the lower limit side adjustment gain Ga is set at −1 (Ga=−1), and in the example of FIG. 14B, the value of the upper limit side adjustment gain Gb is set at −1 (to Gb=−1). As shown in FIG. 15, the values of the lower limit side adjustment gain Ga and the upper limit side adjustment gain Gb can be set on the basis of a value of the lateral acceleration GE and a value of the longitudinal acceleration GH applied to the vehicle.

Namely, in a running condition in which the longitudinal acceleration GH is relatively small and the lateral acceleration GE is relatively large, for example, when the vehicle turns, the left-right difference priority control (for example, the controls shown in FIGS. 13A and 13B) is performed by setting the adjustment gains Ga, Gb at positive values (Ga, Gb=+1~0). On the other hand, in a running condition in which the longitudinal acceleration GH is relatively large and the lateral acceleration GE is relatively small, for example, at the time of rapid acceleration or deceleration in straight-line running, the left-right sum (front-rear distribution) priority control is performed by setting the adjustment gains Ga, Gb at negative values (Ga, Gb=−1~0) (for example, the controls shown in FIGS. 14A and 14B).

It should be noted that as parameters for determining the values of the adjustment gains Ga, Gb, steering angle data may be used instead of the lateral acceleration GE as described above or demand driving torque data may be used instead of the longitudinal acceleration GH. Further, here is described the case in which the lower limit side adjustment gain Ga and the upper limit side adjustment gain Gb are set as separate parameters. Alternatively, a common parameter may be set as the lower and upper limit side adjustment gain.

Figure 16:
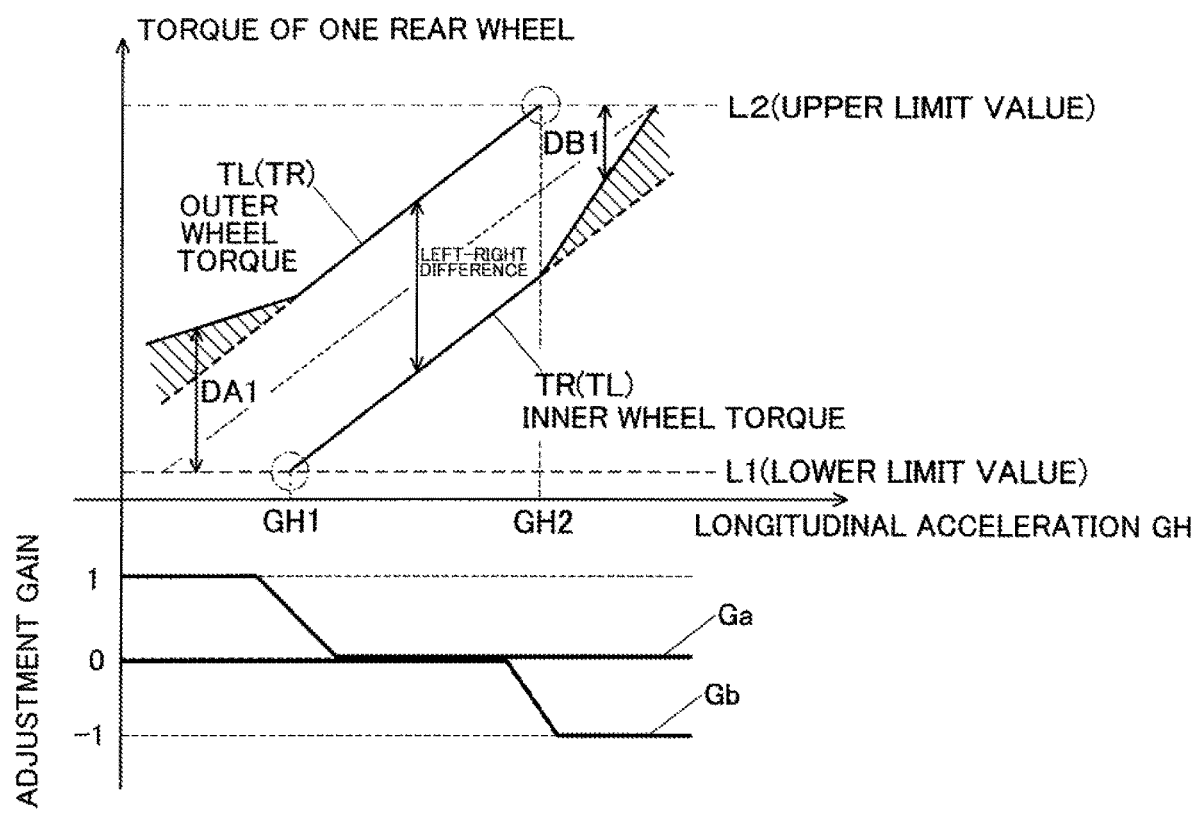
FIG. 16 is a view showing an example of setting adjustment gain.
Figure 17:
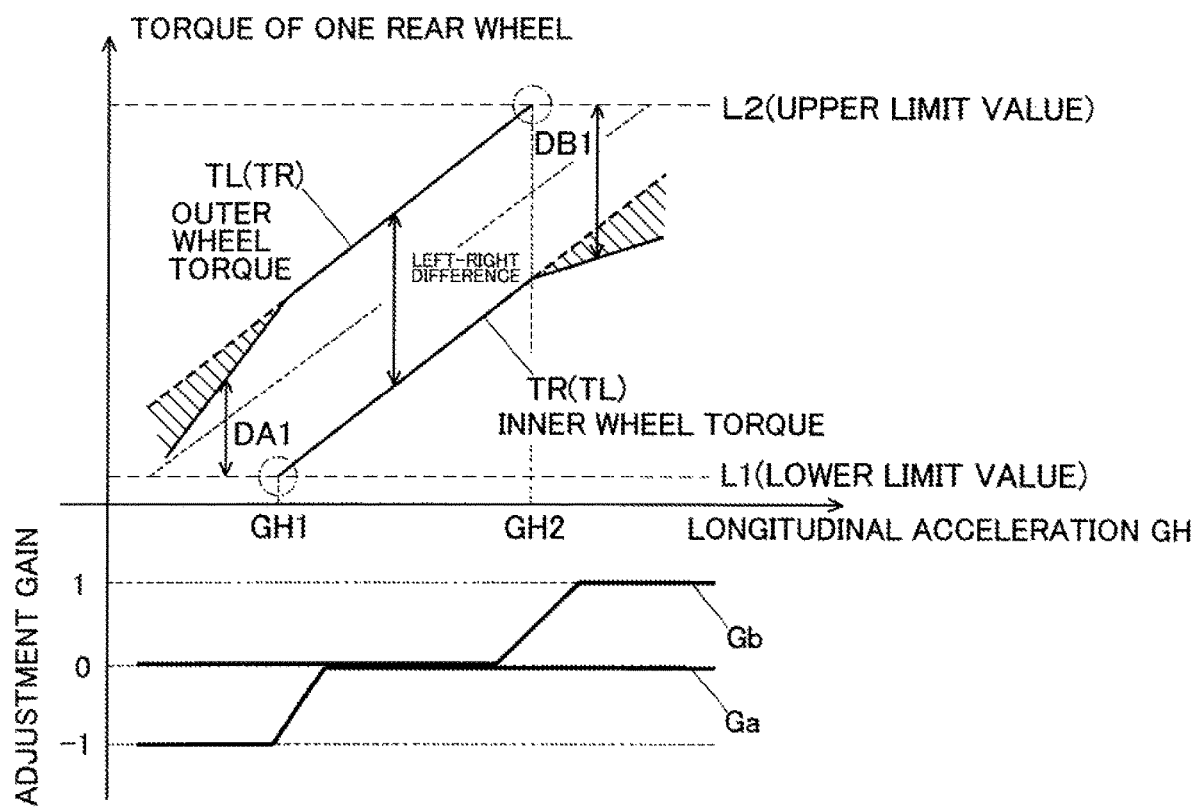
FIG. 17 is a view showing an example of setting adjustment gain.

FIGS. 16 and 17 are views (graphs) showing setting examples of the lower limit side adjustment gain Ga and the upper limit side adjustment gain Gb. The same figures show changes (vertical axis) of the torque TL or TR of one of the rear wheels (the left or right rear wheel WRL, WRR) with respect to the longitudinal acceleration GH (horizontal axis) when the vehicle turns, and the values of the lower limit side adjustment gain Gb and the upper limit side adjustment gain Gb. Here, a case where the vehicle turns (left turn or turn right) with an arbitrary lateral acceleration GE will be described.

In the example shown in FIG. 16, the lower limit side adjustment gain Ga is set at a value in the range of +1 to 0 (Ga=+1~0), and the upper limit side adjustment gain Gb is set at a value in the range of 0 to −1 (Gb=0~−1). In this case, if a value of inner wheel torque TR (TL) falls below the lower limit value L1 when the longitudinal acceleration GH is equal to or less than GH1 (GH1 GH), a control is performed so as to add a shortfall below this lower limit L1 (indicated by the shaded area in the figure) to outer wheel torque TL (TR) distributed to the wheel on the opposite side. This control is to prioritize the difference (left and right difference) in the driving torque distributed to the left rear wheel WRL and the right rear wheel WRR, as shown in FIG. 13A, and thus increase the total value of the driving torque (demand left-right sum torque TM) distributed to the left and right rear wheels WRL, WRR. Also, if a value of the outer wheel torque TL (TR) exceeds the upper limit value L2 when the longitudinal acceleration GH is equal to or larger than GH2 (GH2≤GH), a control is performed so as to add an excess of the upper limit value L2 (indicated by the shaded area in the figure) to the inner wheel torque TR (TL) distributed to the wheel on the opposite side. This control is to maintain the total value of the driving torque (demand left-right sum torque TM) distributed to the left rear wheel WRL and the right rear wheel WRR, as shown in the FIG. 14B, without prioritizing the difference (left-right difference) in the driving torque distributed to the left and right rear wheels WRL, WRR.

Namely, in the example shown in FIG. 16, a torque value of one of the rear wheels (TR or TL) reaches the lower limit value L1 in a range where the longitudinal acceleration GH of the vehicle is relatively small (GH1 GH). Then, the value of the lower limit side adjustment gain Ga is adjusted within the range of +1 to 0 (Ga=+1~0), whereby the left-right difference priority control is performed by adding the shortfall below the lower limit value to the wheel on the opposite side. Further, the torque value (TR or TL) of the one of the rear wheels reaches the upper limit value L2 in a range where the longitudinal acceleration GH of the vehicle is relatively large (GH2≤GH). Then, the value of the upper limit side adjustment gain Gb is adjusted within the range of 0 to −1 (Gb=0~−1), whereby the control of the left-right sum priority (front-rear distribution priority) is performed by adding the excess of the upper limit value to the wheel on the opposite side.

Further, in the example shown in FIG. 17, the value of the lower limit side adjustment gain Ga is set in the range of −1 to 0 (Ga=−1~0), and the value of the upper limit side adjustment gain Gb is set in the range of 0 to +1 (Gb=0~+1). In this case, if the value of the inner wheel torque TR (TL) falls below the lower limit value L1 when the longitudinal acceleration GH is equal to or less than GH1 (GH1≥GH), a control is performed so as to subtract the shortfall below the lower limit value L1 (indicated by the shaded area in the figure) from the outer wheel torque TL (TR) distributed to the wheel on the opposite side. This control is, as shown in FIG. 13B, to prioritize the difference (left-right difference) in the driving torque distributed to the left rear wheel WRL and the right rear wheel WRR and thus reduce the total value of the driving torque (demand left-right sum torque TM) distributed to the left and right rear wheels WRL, WRR. Also, if the value of the outer wheel torque TL (TR) exceeds the upper limit value L2 when the longitudinal acceleration GH is equal to or larger than GH2 (GH2≤GH), a control is performed so as to subtract the excess of the upper limit value L2 (indicated by the shaded area in the figure) from the inner wheel torque TR (TL) distributed to the wheel on the opposite side. This control is, as shown in FIG. 14A, to maintain the total value of the driving torque (demand left-right sum torque TM) distributed to the left rear wheel WRL and the right rear wheel WRR without prioritizing the difference (left-right difference) between the driving torque distributed to the left and right rear wheels WRL, WRR.

Namely, in the example shown in FIG. 17 also, the torque value (TR or TL) of the one of the rear wheels reaches the lower limit value L1 in the range where the longitudinal acceleration GH of the vehicle is relatively small (GH1≥GH). Then, the value of the lower limit side adjustment gain Ga is adjusted in the range of −1 to 0 (Ga=−1~0), whereby the left-right difference priority control is performed by subtracting the shortfall below the lower limit value from the wheel on the opposite side. On the other hand, the torque value (TR or TL) of the one of the rear wheels reaches the upper limit value L2 in a range where the longitudinal acceleration GH of the vehicle is relatively large (GH2≤GH). Then, by adjusting the value of the upper limit side adjustment gain Gb in the range of 0 to +1 (Gb=0~+1), the left-right sum priority (front-rear distribution priority) control is performed by subtracting the excess of the upper limit value from the wheel on the opposite side.

As described above, according to the torque distribution control device for the four-wheel drive vehicle of the present embodiment, if the difference (left-right difference) occurs between the command values of the left and right distribution driving torque TL, TR (the left driving torque and the right driving torque) distributed to each of the left and right auxiliary drive wheels WRL, WRR, and this difference changes (increases), so that the front-rear distribution torque TM, TS (the main drive wheel torque and the auxiliary drive wheel torque) distributed to the auxiliary drive wheels WRL, WRR exceeds the command values thereof, either the left-right difference priority control or the left-right sum priority control is selected and performed according to a running condition of the vehicle. This enables an optimal torque distribution control when performing the front-rear and left-right torque distribution controls. Therefore, the vehicle behavior can be effectively prevented from becoming unstable, and thus the running condition can be improved.

Further, in the torque distribution control device of the present embodiment, if the command value of the left-right distribution driving torque (the demand right rear wheel torque TR, the demand left rear wheel torque TS) distributed to one of the left or right auxiliary drive wheel WRL, WRR falls below or exceeds the predetermined value (upper limit value, lower limit value) L1, L2, the control is performed to add or subtract the amount below or above limit values L1, L2 to or from the other one of the left and right auxiliary drive wheels WRL, WRR (the auxiliary drive wheels on the other side). This enables to maintain the difference in the driving torque distributed to each of the left and right auxiliary drive wheels WRL, WRR (left-right difference), or the difference in the driving torque distributed to two each of the main drive wheels WFL, WFR and the auxiliary drive wheels WRL, WRR (longitudinal difference), in the case where the command value of the driving torque distributed to one of the left or right auxiliary drive wheel WRL, WRR exceeds or falls below the predetermined limit value. This enables the more optimal torque distribution control.

Further, in the torque distribution control device of the present embodiment, in the running condition where the longitudinal acceleration GH of the vehicle is relatively small and the lateral acceleration GE is relatively large, for example, when the vehicle turns, the above-described left-right difference priority control is performed, and in the running condition where the longitudinal acceleration GH of the vehicle is relatively large and the lateral acceleration GE is relatively small, for example, at the time of rapid acceleration or deceleration in straight-line running, the above-described left-right sum priority control is performed. In this manner, if the front-rear distribution driving torque distributed to the auxiliary drive wheels WRL, WRR exceeds the command value thereof, priority is changeable depending on a running condition of the vehicle as to which is preferentially performed, the above-described left-right difference priority control that prioritizes the left-right difference by adding a deficiency of the left-right distribution driving torque to a distribution amount for the left or right drive wheel on the opposite side, or the above-described left-right sum priority control that prioritizes the front-rear difference (front-rear distribution) by subtracting a deficiency of the left-right distribution driving torque from a distribution amount to the left or right drive wheel on the opposite side. Therefore, a more optimal driving torque distribution control can be performed according to a running condition of the vehicle.

The particular configuration of the driving force transmission system shown in FIG. 1 is one example. As far as a general configuration of the driving force transmission system for performing the driving force distribution control according to the present embodiment includes in the four-wheel drive vehicle in which ones and the others of the front wheels and the rear wheels that are respectively the main drive wheels and the auxiliary drive wheels, the front-rear torque distribution device for distributing the driving torque transmitted to the ones and the others of the main drive wheels and the auxiliary drive wheels and the left-right torque distribution device for distributing the driving torque transmitted to one and the other of the left auxiliary wheel and the right auxiliary drive wheel, a specific configuration thereof may be different from that shown in FIG. 1.

In the foregoing, the embodiments of the present invention have been described. However, the present invention is not limited to the above embodiments, but various modifications of the present invention are possible within the scope of the technical idea described in the claims, specification, and drawings. For example, the particular command values of the driving torque shown in the above embodiments are merely examples. Specific numerical values of the command values may be different as long as they are within the range of the present invention.

What is claimed is:

1. A torque distribution control device for a vehicle, the torque distribution control device comprising:
   left and right wheels to which driving torque output from a drive source is transmitted;
   a torque distribution device for distributing the driving torque transmitted to one of a left wheel and a right wheel of the left and right wheels and the other of the left wheel and the right wheel of the left and right wheels according to a running condition of the vehicle; and
   a control device for controlling the driving torque distributed using the torque distribution device,
   wherein the torque distribution device comprises:
      one clutch provided on a path for transmitting the driving torque to the one of the left wheel and the right wheel; and
      another clutch provided on a path for transmitting the driving torque to the other of the left wheel and the right wheel, and
   wherein if a command value of the driving torque distributed to the one of the left wheel and the right wheel using the one clutch falls below a predetermined lower limit value and a command value of the driving torque distributed to the other of the left wheel and the right wheel using the other clutch falls below a predetermined lower limit value, the control device controls the command values of the driving torque to be the predetermined lower limit values.

2. The torque distribution control device for the vehicle according to claim 1, wherein the control device performs a control so that a difference between the command value of the driving torque distributed to the one of the left wheel and the right wheel using the one clutch and the command value of the driving torque distributed to the other of the left wheel and the right wheel using the other clutch is a constant value.

3. The torque distribution control device for the vehicle according to claim 2, wherein if the command value of the driving torque distributed to the one of the left wheel and the right wheels using the one clutch falls below the predetermined lower limit value, the control device performs a control so that a difference between the command value of the driving torque and the predetermined lower limit value is added to the command value of the driving torque distributed to the other of the left wheel and the right wheels using the other clutch.

4. A torque distribution control device for a four-wheel drive vehicle in which ones of front wheels and rear wheels are first drive wheels and the others are second drive wheels, the torque distribution control device comprising:
   a front-rear torque distribution device for distributing driving torque transmitted to the first drive wheels and the second drive wheels;
   a left-right torque distribution device for distributing the driving torque transmitted to a left second drive wheel and a right second drive wheel that are the second drive wheels; and
   a control device for controlling the driving torque distributed using the front-rear torque distribution device and the left-rear torque distribution device,
   wherein if one of a command value of left driving torque distributed to the left second drive wheel and a command value of right driving torque distributed to the right second drive wheel using the left-right torque distribution device falls below a predetermined lower limit value, the control device performs a control so that the one of the command value of the left driving torque and the command value of the right driving torque is the predetermined lower limit value, and the control device calculates a command value of a left-right sum torque, the command value being a sum of the command value of the left driving torque and the command value of the right driving torque, and if the command value of the left-right sum torque falls below the predetermined lower limit value, the control device changes the predetermined lower limit value to the command value of the left-right sum torque.

5. The torque distribution control device for the four-wheel drive vehicle according to claim 4, wherein the control device performs a control so that a difference between the command value of the left driving torque and the command value of the right driving torque is a constant value.

6. The torque distribution control device for the four-wheel drive vehicle according to claim 5, wherein if one of the command value of the left driving torque and the command value of the right driving torque falls below the predetermined lower limit value, the control device performs a control so that a difference between the one of the command value of the left driving torque and the command value of the right driving torque is added to the other of the command value of the left driving torque and the command value of the right driving torque.

7. A torque distribution control device for a four-wheel drive vehicle, in which ones of front wheels and rear wheels are first drive wheels and the others are second drive wheels, the torque distribution control device comprising:
a front-rear torque distribution device for transmitting first driving wheel torque and second driving wheel torque respectively to the first driving wheels and the second driving wheels;
a left-right torque distribution device for transmitting left driving torque and right driving torque respectively to a left second drive wheel and a right second drive wheel, being respectively the left and right of the second drive wheels; and
a control device for controlling the first driving wheel torque and the second driving wheel torque distributed using the front-rear torque distribution device and the left driving torque and the right driving torque distributed using the left-right torque distribution device,
wherein if the second driving wheel torque, being a sum of the left driving torque and the right driving torque, exceeds a command value of the second driving wheel torque due to a change in a difference between a command value of the left driving torque and a command value of the right driving torque, the control device selects and performs, according to a running condition of the vehicle, either a left-right difference priority control prioritizing to make a difference between the left driving torque and the right driving torque follow a command value of the difference or a left-right sum priority control prioritizing to make the sum of the left driving torque and the right driving torque follow a command value of the sum.

8. The torque distribution control device for the four-wheel drive vehicle according to claim 7, wherein the left-right difference priority control is selected if one of the command value of the left driving torque and the command value of the right driving torque falls below a preset lower limit value, add a shortfall below the lower limit value to the other of the command value of the left driving torque and the command value of the right driving torque, or if one of the command value of the left driving torque and the command value of the right driving torque exceeds a preset upper limit value, subtract an excess of the upper limit value from the other of the command value of the left driving torque and the command value of the right driving torque.

9. The torque distribution control device for the four-wheel drive vehicle according to claim 8, the torque distribution control device comprising a unit for determining a running condition of the vehicle:
the unit determines longitudinal acceleration based on a vehicle speed detected from a vehicle speed sensor, and determines lateral acceleration based on the vehicle speed and a steering angle detected from a steering angle sensor, and
wherein the control device performs the left-right difference priority control in a running condition where the longitudinal acceleration of the vehicle is relatively small and the lateral acceleration is relatively large and performs the left-right sum priority control in a running condition where the longitudinal acceleration of the vehicle is relatively large and the lateral acceleration is relatively small.

10. The torque distribution control device for the four-wheel drive vehicle according to claim 7, wherein the left-right sum priority control is selected if one of the command value of the left driving torque and the command value of the right driving torque falls below a preset lower limit value, subtract a shortfall below the lower limit value from the other of the command value of the left driving torque and the command value of the right driving torque, or if one of the command value of the left driving torque and the command value of the right driving torque exceeds a preset upper limit value, add an excess of the upper limit value to the other of the command value of the left driving torque and the command value of the right driving torque.

11. The torque distribution control device for the four-wheel drive vehicle according to claim 10, the torque distribution control device comprising a unit for determining a running condition of the vehicle:
the unit determines longitudinal acceleration based on a vehicle speed detected from a vehicle speed sensor, and determines lateral acceleration based on the vehicle speed and a steering angle detected from a steering angle sensor, and
wherein the control device performs the left-right difference priority control in a running condition where the longitudinal acceleration of the vehicle is relatively small and the lateral acceleration is relatively large and performs the left-right sum priority control in a running condition where the longitudinal acceleration of the vehicle is relatively large and the lateral acceleration is relatively small.

12. The torque distribution control device for the four-wheel drive vehicle according to claim 7, the torque distribution control device comprising a unit for determining a running condition of the vehicle:
the unit determines longitudinal acceleration based on a vehicle speed detected from a vehicle speed sensor, and determines lateral acceleration based on the vehicle speed and a steering angle detected from a steering angle sensor, and
wherein the control device performs the left-right difference priority control in a running condition where the longitudinal acceleration of the vehicle is relatively small and the lateral acceleration is relatively large and performs the left-right sum priority control in a running condition where the longitudinal acceleration of the vehicle is relatively large and the lateral acceleration is relatively small.

\* \* \* \* \*